United States Patent
Yu et al.

(10) Patent No.: US 11,811,756 B2
(45) Date of Patent: Nov. 7, 2023

(54) IDENTITY AUTHENTICATION METHOD BASED ON BIOMETRIC FEATURE, AND IDENTITY AUTHENTICATION SYSTEM THEREOF

(71) Applicant: CHINA UNIONPAY CO., LTD., Shanghai (CN)

(72) Inventors: Weiqi Yu, Shanghai (CN); Sishuang Wan, Shanghai (CN); Shuo He, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/620,850

(22) PCT Filed: Aug. 24, 2020

(86) PCT No.: PCT/CN2020/110740
§ 371 (c)(1),
(2) Date: Dec. 20, 2021

(87) PCT Pub. No.: WO2021/043014
PCT Pub. Date: Mar. 11, 2021

(65) Prior Publication Data
US 2022/0321559 A1    Oct. 6, 2022

(30) Foreign Application Priority Data
Sep. 4, 2019    (CN) .......................... 201910831507.4

(51) Int. Cl.
*H04L 9/40*    (2022.01)
*H04W 12/64*    (2021.01)
(Continued)

(52) U.S. Cl.
CPC ........ *H04L 63/0861* (2013.01); *G06V 40/172* (2022.01); *H04W 4/021* (2013.01); *H04W 12/06* (2013.01); *H04W 12/64* (2021.01)

(58) Field of Classification Search
None
See application file for complete search history.

(56) References Cited

U.S. PATENT DOCUMENTS 7,710,967 B2 * 5/2010 Popoviciu ........... H04L 12/2801
370/395.31
10,685,519 B2    6/2020 Xu
(Continued)

FOREIGN PATENT DOCUMENTS

CN    104063690 A    9/2014
CN    107483416 A    12/2017
(Continued)

OTHER PUBLICATIONS

International Application No. PCT/CN2020/110740, International Search Report, dated Nov. 27, 2020.
(Continued)

*Primary Examiner* — Piotr Poltorak
(74) *Attorney, Agent, or Firm* — MARSHALL, GERSTEIN & BORUN LLP

(57) ABSTRACT

The present invention relates to a biometric-based identity authentication method and system. The method includes: obtaining mobile terminal numbers of all users entering a specified area through a base station associated with the specified area which the users enter to generate a first mobile terminal number list; recognizing biometrics of users, and obtaining a second mobile terminal number list composed of n mobile terminal numbers with the highest similarity to the biometrics based on a pre-established binding relationship between biometrics of users and the mobile terminal numbers; and comparing the first mobile terminal number list
(Continued)

with the second mobile terminal number list, wherein on the condition that the intersection of the two is one mobile terminal number, it is determined that the user of the mobile terminal number is the user with successful identity authentication, and on the condition that the intersection of the two is more than one number, it is determined that the user of the mobile terminal number with the highest biometric similarity in the intersection is the user with successful identity authentication. According to the present invention, the range of face recognition N can be narrowed down, and a user only needs to carry a mobile phone and 1:N face recognition can be completed without additional operations.

11 Claims, 22 Drawing Sheets

(51) Int. Cl.
  G06V 40/16 (2022.01)
  H04W 4/021 (2018.01)
  H04W 12/06 (2021.01)

(56) References Cited

U.S. PATENT DOCUMENTS

| | | | |
|---|---|---|---|
| 10,713,346 | B2 | 7/2020 | Park |
| 2006/0129840 | A1* | 6/2006 | Milgramm ............... H04L 9/40 713/186 |
| 2009/0070860 | A1 | 3/2009 | Hirata et al. |
| 2020/0053538 | A1* | 2/2020 | Zheng ..................... G06F 21/32 |
| 2020/0106771 | A1* | 4/2020 | Guibert ................. H04L 63/045 |
| 2020/0193445 | A1* | 6/2020 | Ambrosini ....... G06Q 20/40145 |
| 2020/0280561 | A1* | 9/2020 | Zheng ................ H04L 63/1433 |

FOREIGN PATENT DOCUMENTS

| | | | |
|---|---|---|---|
| CN | 108173871 | * | 6/2018 |
| CN | 108182414 A | | 6/2018 |
| CN | 108830592 A | | 11/2018 |
| CN | 109389723 A | | 2/2019 |
| CN | 109598426 A | | 4/2019 |
| CN | 109711133 | * | 5/2019 |
| CN | 109711133 A | | 5/2019 |
| CN | 110933603 A | | 3/2020 |
| CN | 111757465 | * | 10/2020 |
| CN | 112312301 | * | 2/2021 |
| JP | 2010108112 A | | 5/2010 |
| JP | 2017059060 A | | 3/2017 |
| WO | WO-2018/169150 A1 | | 9/2018 |

OTHER PUBLICATIONS

Chinese Patent Application No. 201910831507.4, Notification to Grant Patent Rights, dated Jun. 28, 2021.
Chinese Patent Application No. 201910831507.4, First Office Action, dated Oct. 9, 2020.
Chinese Patent Application No. 201910831507.4, Second Office Action, dated Apr. 8, 2021.
Japanese Patent Application No. 2021-576570, Office Action, dated Aug. 8, 2022.

* cited by examiner

IDENTITY AUTHENTICATION METHOD BASED ON BIOMETRIC FEATURE, AND IDENTITY AUTHENTICATION SYSTEM THEREOF

CROSS-REFERENCE TO RELATED APPLICATION(S)

This application is a U.S. national application of PCT/CN2020/110740, filed on Aug. 24, 2020, which claims priority to Chinese Application No. 201910831507.4, filed Sep. 4, 2019, the entire disclosures of which are hereby incorporated by reference in their entirety.

TECHNICAL FIELD

The present application relates to computer technology, in particular to a biometric-based identity authentication method and a biometric-based identity authentication system.

BACKGROUND

At present, face recognition technology is developing rapidly, and its technology maturity has basically met the requirements of financial applications for recognition accuracy and recognition efficiency. It is mostly used in payment and public security scenarios. For example, iPhone X launched the Face ID function, Alipay piloted face-swiping payment, and the Agricultural Bank launched face-swiping withdrawals. Face recognition technology is becoming one of the most rapidly developing biometric technologies with the broadest application prospects.

In terms of technical solutions, face recognition is generally divided into two types in the industry, namely 1:1 and 1:N, according to the number of recognition ranges. 1:1 means that in the recognition process, the face information in the sample photo is known, and the photo to be recognized is compared with the known sample face photo to determine whether it is the same face in the photos. 1:N means that in the recognition process, a face sample database having N sample photos is provided, and the face photo to be recognized is compared with the samples in the database to recognize that the face photo belongs to a certain sample in the database.

Currently, in the 1:N application, due to the limitations of the current technology, when the number of face data N in the database is relatively large, the accuracy of the recognition result drops significantly. That is, it is possible that the similarity of a wrong face will be higher than that of a correct face. Therefore, it is very difficult to apply 1:N in a non-closed high-traffic scenario.

In addition, 5G technology is also a hot technology in the past two years. In the 5G era, the deployment of base stations will change, that is, it will be a combination with outdoor "macro site" as the base and indoor multiple "small cell sites" as the supplementary. Small cell sites have the characteristics of limited signal coverage area, easy deployment, self-optimization and low cost, and will be the backbone of indoor scenarios in the future. At the same time, the operator can learn the mobile phone numbers of users accessing the small cell site. Using this feature, a face recognition method based on 5G base station can be formed in cooperation with the operator.

As the conventional technology, the current 1:N face recognition mainly has four modes:

The first mode is face recognition in a closed environment, for example, an environment having a small area coverage where N is controllable and has a fixed upper limit, such as a park, a campus, and the like.

The second mode is to narrow down N through auxiliary methods. For example, the face recognition of Alipay requires the user to enter the last 4 digits of the mobile phone number to narrow down N.

The third mode is to obtain mobile phone number of users and corresponding location information through the 5G base station, and then the facial features of users are sent from the cloud database to the edge node closest to the commonly used historical location of users to be saved according to the commonly used historical location information of users. During recognition, facial features of users are compared with the face database stored in the edge node for recognition to narrow down the range of N.

The fourth mode is to register the face and the Bluetooth mac address of the mobile phone when the user registers. During recognition, the Bluetooth function of the mobile phone is turned on, and the range of N is narrowed down through the mac address accessed by the merchant.

However, the above-mentioned conventional technology has the following disadvantages:

(1) The first mode limits the scope of use of face recognition. Face recognition cannot be achieved in some open scenarios such as supermarkets and restaurants.

(2) In the second mode, users need to perform additional operations to narrow down the range of N, which degrades the user experience of using face recognition.

(3) The method described in the third mode requires the additional construction of edge device nodes, and the method of recording human faces through historical locations has low accuracy and is prone to failure to recognize.

(4) In the fourth mode, during recognition, the user needs to turn on the Bluetooth function of the mobile phone. The Bluetooth function is not a common user function, that is, it requires the user to perform an additional open operation, which degrades the user experience.

SUMMARY

In view of the above problems, the present application aims to provide a biometric-based identity authentication method and a biometric-based identity authentication system that can accurately realize identity authentication in an open environment.

The biometric-based identity authentication method of the present application is a method for identity authentication based on the biometrics of a user and the mobile terminal carried by the user, which includes:

a step of generating a first mobile terminal number list: obtain mobile terminal numbers of all users entering a specified area through a base station associated with the specified area which the user enters to generate a first mobile terminal number list;

a step of generating a second mobile terminal number list: recognize the biometrics of the users, and obtain a second mobile terminal number list composed of n mobile terminal numbers with the highest similarity to the biometrics based on a pre-established binding relationship between the biometrics of the users and the mobile terminal numbers, where n is a natural number greater than 1; and a step of comparison: compare the first mobile terminal number list with the second mobile terminal number list, wherein on the condition that the intersection of the two is one mobile terminal number, it is determined that the user of the mobile terminal number is the user with successful identity authentication, and on the condition that the intersection of the two is more than one number, it is determined that the user of the mobile terminal number with the highest similarity to the biometrics in the intersection is the user with successful identity authentication.

The biometric-based identity authentication system of the present application, including:

a base station configured to obtain in real time mobile terminal numbers of users entering the coverage area of the base station, and send the mobile terminal numbers of the users and the identification number of the base station to a base station management module below;

a base station management module configured to receive the mobile terminal numbers of the users and the identification number of the base station, obtain the mobile terminal numbers of all users entering a specified area according to a pre-stored association relationship between the identification number of the base station and the specified area to generate a first mobile terminal number list, and send the first mobile terminal number list to a biometric recognition background below;

a biometric recognition terminal configured to obtain biometrics of users;

a biometric recognition background configured to pre-store a binding relationship between biometrics of users and mobile terminal numbers, obtain a second mobile terminal number list composed of n mobile terminal numbers with the highest similarity to the biometrics of the user recognized by the biometric recognition terminal based on the binding relationship, where n is a natural number greater than 1, and on the other hand receive the first mobile terminal number list sent by the base station management module, and compare the first mobile terminal number list with the second mobile terminal number list, wherein on the condition that the intersection of the two is one mobile terminal number, it is determined that the user of the mobile terminal number is the user with successful identity authentication, and on the condition that the intersection of the two is more than one number, it is determined that the user of the mobile terminal number with the highest similarity to the biometrics in the intersection is the user with successful identity authentication.

The biometric recognition background of the present application, including:

a biometric database configured to pre-store a binding relationship between biometrics of users and mobile terminal numbers;

a receiving module configured to receive from the outside biometrics of users, and on the other hand receive from the outside a first mobile terminal number list composed of mobile terminal numbers of all users entering a specified area;

a biometric recognition module configured to obtain a second mobile terminal number list composed of n mobile terminal numbers with the highest similarity to biometrics of users received by the receiving module based on a pre-stored binding relationship in the biometric database, where n is a natural number greater than 1, and on the other hand compare the first mobile terminal number list with the second mobile terminal number list, wherein on the condition that the intersection of the two is one mobile terminal number, it is determined that the user of the mobile terminal number is the user with successful identity authentication, and on the condition that the intersection of the two is more than one number, it is determined that the user of the mobile terminal number with the highest similarity to the biometrics in the intersection is the user with the successful identity authentication.

The biometric-based identity authentication system of the present application, includes:

a base station configured to obtain in real time mobile terminal numbers of users entering the coverage area of the base station, and send the mobile terminal numbers of the users and the identification number of the base station to a base station management module below;

a base station management module configured to receive the mobile terminal numbers of the users and the identification number of the base station, and obtain the mobile terminal numbers of all users entering a specified area according to a pre-stored association relationship between the identification number of the base station and the specified area to generate a first mobile terminal number list;

a biometric recognition terminal configured to obtain biometrics of users; and a biometric recognition background configured to pre-store a binding relationship between biometrics of users and the mobile terminal numbers, obtain a second mobile terminal number list composed of n mobile terminal numbers with the highest similarity to biometrics of users recognized by the biometric recognition terminal according to the binding relationship, and send the second mobile terminal number list to the base station management module, where n is a natural number greater than 1, wherein, the base station management module receives the second mobile terminal number list sent by the biometric recognition background, compares the first mobile terminal number list with the second mobile terminal number list, and returns the intersection of the two to the biometric recognition background, and the biometric recognition background determines the intersection of the two received, wherein on the condition that the intersection of the two is one mobile terminal number, it is determined that the user of the mobile terminal number is the user with successful identity authentication, and on the condition that the intersection of the two is more than one number, it is determined that the user of the mobile terminal number with the highest similarity to the biometrics in the intersection is the user with successful identity authentication.

The base station management module of the present application includes:

a first receiving module configured to receive mobile terminal numbers of users entering the coverage area of the base station and an identification number of the base station sent from the base station;

a base station database configured to pre-store an association relationship between the identification number of the base station and a specified area;

a first comparison processing module configured to obtain mobile terminal numbers of all users entering the specified area according to the association relationship stored in the base station database and the mobile terminal numbers of the users and the identification number of the base station received by the first receiving module to generate a first mobile terminal number list;

a second receiving module configured to receive from the outside a second mobile terminal number list, wherein the second mobile terminal number list is composed of n mobile terminal numbers with the highest similarity to biometrics of users, where n is a natural number greater than 1, and a second comparison processing module configured to compare the first mobile terminal number list with the second mobile terminal number list, and obtain the intersection of the two.

A computer-readable medium of the present application has a computer program stored thereon, wherein:

when the computer program is executed by the processor, the above-mentioned biometric-based identity authentication method is implemented.

A computer equipment of the present application includes a memory, a processor, and a computer program stored on the memory and executable on the processor, wherein the above-mentioned biometric-based identity authentication method is implemented when the processor executes the computer program.

DETAILED DESCRIPTION

Some of the multiple embodiments of the present application are introduced below to provide a basic understanding of the present application. It is not intended to determine the key or decisive elements of the present application or limit the scope of protection of the present application.

For brevity and illustrative purposes, this text mainly refers to its exemplary embodiments to describe the principles of the present application. However, those skilled in the art will readily recognize that the same principles can be equally applied to all types of biometric-based identity authentication methods and biometric-based identity authentication systems, and these same principles can be implemented therein, where any such changes do not deviate from the true spirit and scope of the present patent application.

In addition, in the following description, reference is made to the accompanying drawings, which illustrate specific exemplary embodiments. Electrical, mechanical, logical, and structural changes can be made to these embodiments without departing from the spirit and scope of the present application. Moreover, although the features of the present application are disclosed in conjunction with only one of several implementations/embodiments, on the condition that any given or identifiable function may be found to be desired and/or advantageous, these features can be combined with one or more other features of other implementations/embodiments. Therefore, the following description should not be considered in a limiting sense, and the scope of the present application is defined by the appended claims and their equivalents.

Terms such as "have", "include" and the like mean that in addition to the units and steps that are directly and clearly stated in the specification and claims, the technical solution of the present application does not exclude the scenarios of having other units and steps that are not directly or clearly stated. Terms such as "first" and "second" do not indicate the order of the units in terms of time, space, size, etc., but merely serve to distinguish the units.

First, the scenarios and technical framework of the present application will be described.

Figure 1:
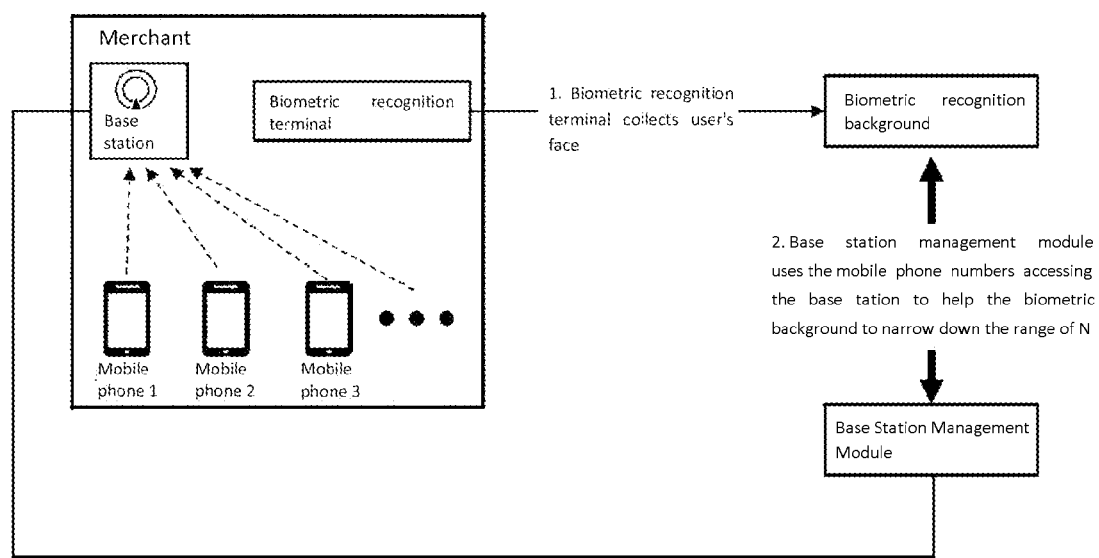
FIG. 1 is a schematic diagram showing a scenario of a biometric-based identity authentication system and identity authentication method of the present application.

FIG. 1 is a schematic diagram showing a scenario of a biometric-based identity authentication system and identity authentication method of the present application.

As shown in FIG. 1, in the present application, users carry mobile phone 1, mobile phone 2, and mobile phone 3 . . . ("mobile phones" corresponds to "mobile terminals" in the claims, and mobile phone will also be taken as an example for description in the following text) and enter a merchant covered by base station signals ("merchant area" corresponds to the "specified area" in the claims, and the merchant will also be taken as an example for description in the following text). A biometric recognition terminal collects biometrics of users and sends them to a biometric recognition background. On the other hand, a base station management module can learn the mobile phone numbers accessing the base station corresponding to the merchant. Through the interaction between the biometric recognition background and the base station management module, the mobile phone numbers accessing the base station will be obtained by the base station to narrow down the range of N, so as to lock and narrow down the search range of biometrics, thereby ensuring the accuracy of biometric recognition results and completing biometric recognition. In the present application, biometrics includes, but is not limited to, any one or a combination of the following: human faces, finger veins, irises, fingerprints, palm prints, and voices.

Figure 2:
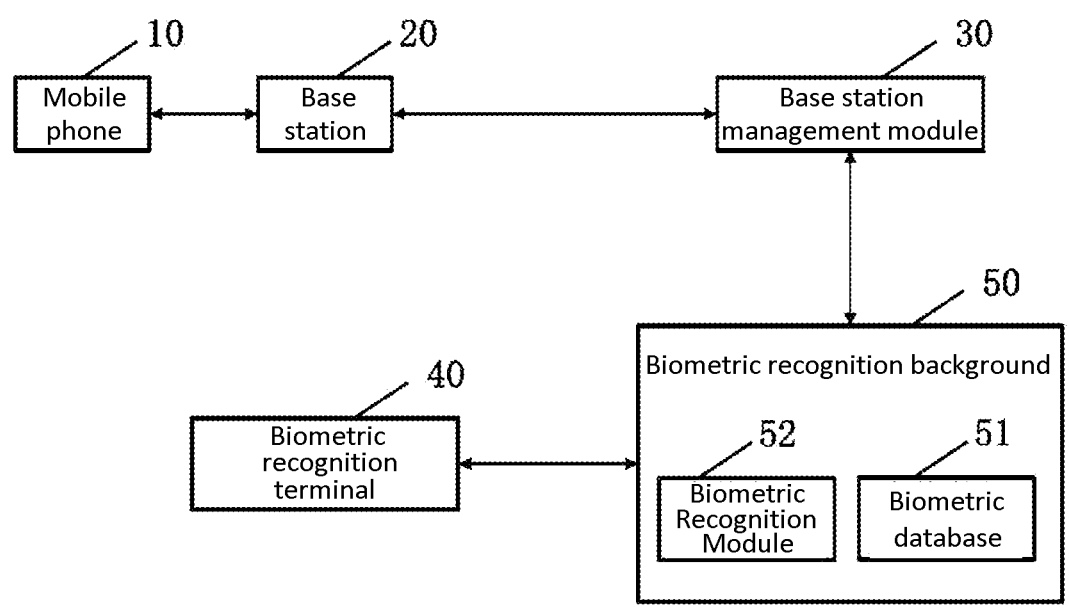
FIG. 2 is a schematic diagram showing the technical framework of a biometric-based identity authentication system of the present application.

FIG. 2 is a schematic diagram showing the technical framework of a biometric-based identity authentication system of the present application.

As shown in FIG. 2, the biometric-based identity authentication system of the present application mainly includes a base station 20, a base station management module 30, a biometric recognition terminal 40, and a biometric recognition background 50.

Next, these structural parts will be described.

First, the base station 20 will be described.

In the present application, the base station is an improved base station used for signal coverage of indoor merchants. At present, almost all base stations can obtain the mobile phone numbers accessing them. However, an existing base station usually sends the information obtained from the accessed mobile phones to a core network through traditional communication protocols, and the obtained information of the mobile phones contains other information in addition to the mobile phone numbers, which makes it difficult for operators to obtain in real time the mobile phone numbers accessing the base station. Therefore, the existing base stations need to be improved.

Usually, a base station will continuously broadcast its location information. When a mobile phone enters a new area (or is turned on), it will find that its original location information is different from the received broadcast location information. The mobile phone information will be transmitted to the base station, and then the information will be sent to the core network, allowing the background to re-register the location of the mobile phone. The improved base station not only transmits the mobile phone related information to the core network through the traditional communication protocols, but also separately sends necessary information such as the mobile phone number to the base station management module.

Figure 3:
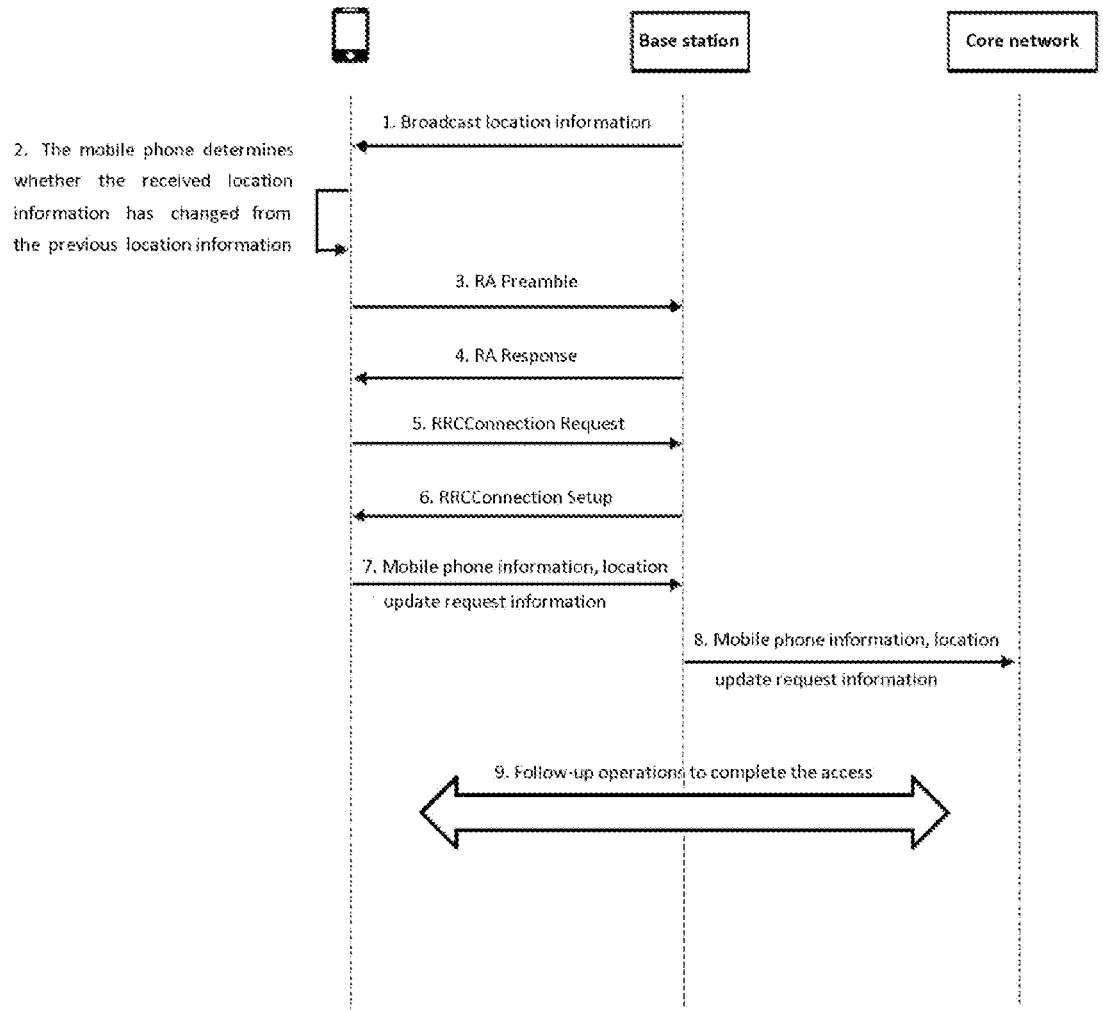
FIG. 3 is a schematic flowchart showing information exchange between a mobile phone, a base station, and a core network taking 4G-LTE as an example.
Figure 4:
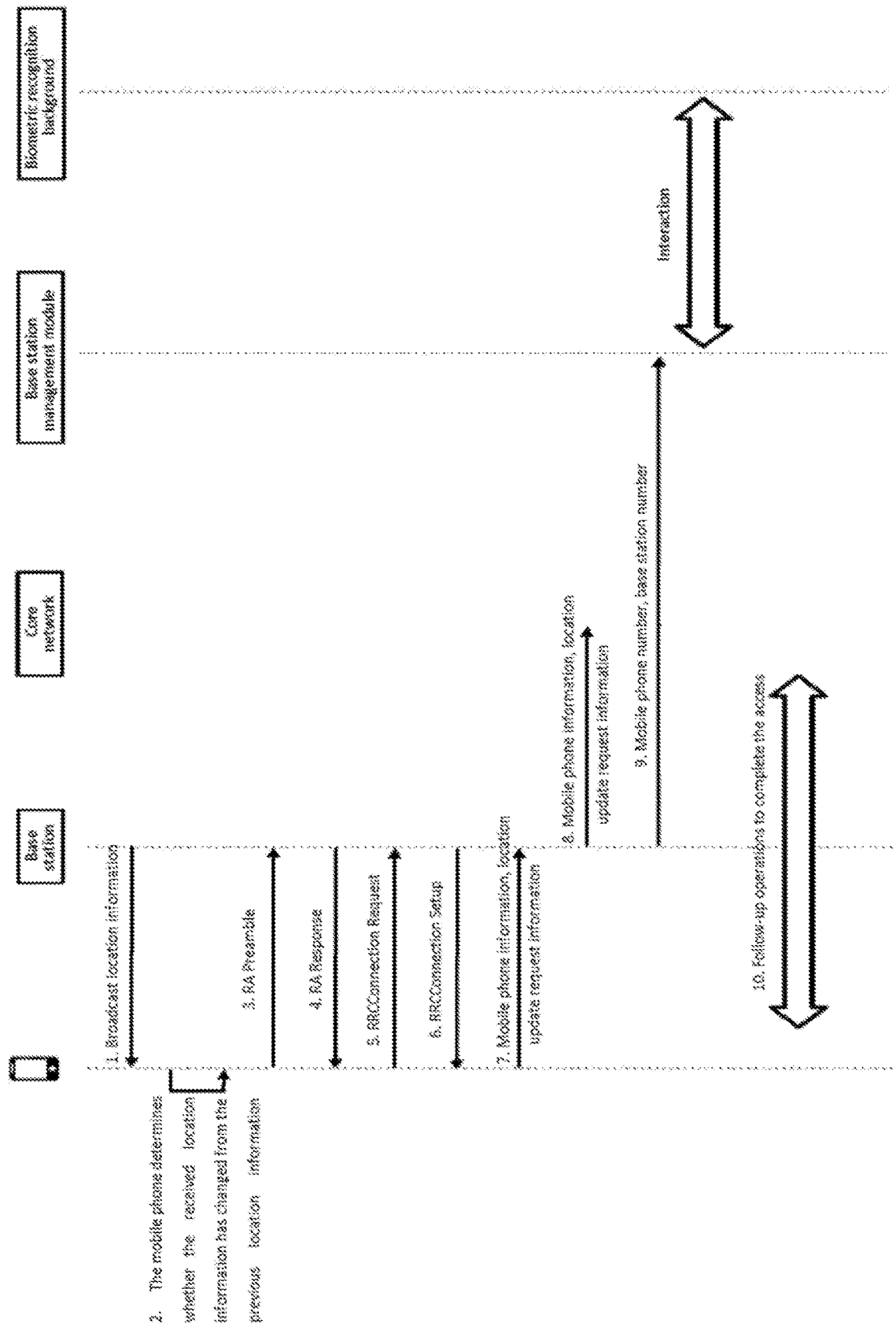
FIG. 4 is a schematic flowchart with a newly-added step of the present application.

FIG. 3 is a schematic flowchart showing information exchange between a mobile phone, a base station, and a core network, taking 4G-LTE as an example. FIG. 4 is a schematic flowchart with a newly-added step of the present application.

As shown in FIG. 3, the original flow taking 4G-LTE as an example is as follows:

1. The base station broadcasts location information;

2. After receiving the location information, the mobile phone determines whether the information has changed from the pre-stored location (that is, whether it has entered a new area);

3-6 are some preprocessing processes, specifically:

3. RA Preamble represents the random access preamble. The process of 3 is to send a random access request to the base station;

4. RA Response represents response to random access;

5. RRCConnection Request represents sending an RRC connection establishment request;

6. Establish an RRC connection;

7. The mobile phone sends mobile phone information including (IMEI, i.e., International Mobile Equipment Identity, IMSI, i.e., International Mobile Subscriber Identity, mobile phone number, etc.) to the base station;

8. The base station transmits the mobile phone information and location update request information to the core network; and 9. Interactive operations between mobile phone, base station, and core network to complete follow-up operations.

In the present application, all the above-mentioned communication procedures are retained, but a new step is added, which is step "9" shown in FIG. 4 (the base station transmits the separate mobile phone number information to the base station management module), and the base station management module will interact with the biometric recognition background.

On the other hand, in order to ensure effect, merchants can deploy multiple base stations according to actual scenarios.

Next, biometric recognition terminal 40 will be described.

As an example, biometric recognition terminal 40 may be placed at the merchant checkout for collecting user biometrics and prompting the biometric recognition results. The biometric recognition terminal 40 includes, but is not limited to prompt devices such as a liquid crystal display, LED, etc., and is at the same time equipped with a voice reminder function to provide users with a good payment experience through humanized service.

Next, biometric recognition background 50 will be described. The biometric recognition background 50 includes a biometric recognition module 52 and a biometric database 51. The biometric database 51 stores a one-to-one correspondence between biometrics and mobile phone numbers. The biometrics recognition module 52 is used to compare the collected biometrics with the biometrics in the biometric database 51 on a one-to-one basis to obtain similarity, and list the mobile phone numbers of the n individuals with the highest similarity. Here, n is not limited, which can be any natural number greater than 1. As an example in Table 1 below, n is taken as 10.

TABLE 1

| Merchant Number | n Mobile Phone Numbers with Highest Similarity |
|---|---|
| 1 | 13658912383 |
| | 13887123241 |
| | 13714741314 |
| | 13653422383 |
| | 13887324241 |
| | 13718921314 |
| | 13658912383 |
| | 13887324231 |
| | 13718921315 |
| | 13718927314 |

Finally, base station management module 30 is described.

Base station management module 30 stores a corresponding relationship between base station 20 and the merchant (of course, the corresponding relationship may also be stored in biometric recognition background 50; base station management module 30, i.e., the operator storing the corresponding relationship is taken as an example here), and maintains the list of mobile phone numbers accessing the base station 20. As the corresponding relationship between base stations and merchants, it can be that one merchant corresponds to one base station number, or one merchant corresponds to multiple base station numbers, or multiple merchants correspond to one base station number. For example, Table 2 shows the corresponding relationship between merchant numbers and base station numbers and examples of mobile phone numbers accessing each base station number.

TABLE 2

| Merchant Number | Base Station Number | Access Mobile Phone Number |
|---|---|---|
| 1 | 1 | 13657812383 |
|   |   | 13812324241 |
|   |   | 13712321314 |
|   |   | ... |
| 2 | 2 | 13657816783 |
|   |   | 13856324241 |
|   |   | 13712329814 |
|   |   | ... |
| 3 | 3 | 136517589512 |
|   |   | 156184546596 |
|   |   | 135454545454 |
|   |   | ... |
|   | 4 | 137895425515 |
|   |   | 135854596566 |
|   |   | 139455566558 |
|   |   | ... |
| 4 | 5 | 138556468523 |
|   |   | 136598466852 |
|   |   | 134596266552 |
| 5 |   | ... |

As described above, the biometric-based identity authentication system according to one aspect of the present application can include:

a base station 20 configured to obtain in real time mobile phone numbers of mobile phones 10 of users entering a coverage area of the base station 20, and send the mobile phone numbers of the users and an identification number of the base station to a base station management module 30;

a base station management module 30 configured to receive the mobile phone numbers of the users and the identification number of the base station, obtain mobile phone numbers of users entering the merchant according to a pre-stored association relationship between the identification number of the base station and the merchant to generate a first mobile phone number list, and send the first mobile phone number list to a biometric recognition background 50 below;

a biometric recognition terminal 40 configured to obtain biometrics of users;

a biometric recognition background 50 comprising a biometric recognition module 52 for pre-storing a binding relationship between biometrics of users and mobile phone numbers, configured to obtain a second mobile phone number list composed of N mobile phone numbers with the highest similarity to the biometrics of the users recognized by the face recognition terminal 40 based on the binding relationship, where N is a natural number greater than 1, and on the other hand receive the first mobile phone number list sent by the base station management module 30, and compare the first mobile phone number list with the second mobile phone number list, wherein on the condition that the intersection of the two is one mobile phone number, it is determined that the user of the mobile phone number is the user with successful identity authentication, and on the condition that the intersection of the two is more than one number, it is determined that the user of the mobile phone number with the highest similarity to the biometrics in the intersection is the user with successful identity authentication.

Here lists a comparison between the first mobile phone number list and the second mobile phone number list carried out in the biometric recognition background 50. As an alternative, a comparison between the first mobile phone number list and the second mobile phone number list can also be carried out in the base station management module 30, specifically:

A biometric-based identity authentication system according to another aspect of the present application can include:

a base station 20 configured to obtain in real time mobile phone numbers of users 10 entering a coverage area of the base station 20, and send the mobile phone numbers of the users 10 and an identification number of the base station to a base station management module 30 below;

a base station management module 30 configured to receive from the base station 20 the mobile phone numbers of the users and the identification number of the base station, and obtain mobile phone numbers of users entering the merchant according to a pre-stored association relationship between the identification number of the base station and the merchant to generate a first mobile phone number list;

a biometric recognition terminal 40 configured to obtain biometrics of users;

a biometric recognition background 50 comprising a biometric recognition module 52 for pre-storing a binding relationship between biometrics of users and mobile phone numbers, configured to obtain a second mobile phone number list composed of N mobile phone numbers with the highest similarity to the biometrics of the user recognized by the biometric recognition terminal 40 based on the binding relationship, and send the second mobile phone number list to the base station management module 30, where n is a natural number greater than 1, Wherein, the base station management module 30 receives a second mobile phone number list sent by the biometric recognition background 50, compares the first mobile phone number list with the second mobile phone number list, and returns the intersection of the two to the biometric recognition background 50.

The biometric recognition background 50 determines the intersection of the two received. On the condition that the intersection of the two is one mobile phone number, it is determined that the user of the mobile phone number is the user with successful identity authentication. On the condition that the intersection of the two is more than one number, it is determined that the user of the mobile phone number with the highest similarity to the biometrics in the intersection is the user with successful identity authentication.

As mentioned above, in the present application, the 1:N scheme is adopted for biometric recognition. In order to ensure the accuracy of the recognition result, the number N is controlled within a certain range through screening of mobile phone numbers.

Next, the biometric-based identity authentication method of the present application will be described. In the biometric-based identity authentication method of the present application, the information obtained by the interaction between the mobile terminals and the base station is used to narrow down the range of N, and the recognition range is dynamically controlled to be the user groups appearing in the current area (such as a merchant, transportation facility, etc.), not all registered users. In the following description, "merchant" is taken as an example for "specified area", and mobile phone is taken as an example for mobile terminal.

The biometric-based identity authentication method of the present application as a whole includes three phases of a registration phase, a preprocessing phase, and a recognition phase:

1. Registration Phase

At the registration phase, users submit biometrics (such as face photos, fingerprint information, palm print information, iris information, etc.), bank cards, mobile phone numbers, and bind them.

2. Preprocessing Phase

Users will enter the merchant before biometric recognition. When entering the merchant, users need to bring mobile phones, the base station broadcasts location information, mobile phones send an information update request and mobile phone information to the base station, and the mobile phone numbers and base station number are sent to the base station management module. The base station management module stores the corresponding relationship between the base station and the merchant, and dynamically maintains a mobile phone number list in the merchant, that is, dynamically provides a first list of mobile phone numbers accessing the base station.

3. Recognition Phase

In the recognition phase, biometrics of users are recognized, a second mobile phone number list composed of n mobile terminal numbers with the highest similarity to the biometrics is obtained based on the pre-established binding relationship between biometrics of users and mobile terminal numbers, and the first mobile phone number list is then compared with the second mobile phone number list to complete biometric recognition, where n is a natural number greater than 1.

For different scenarios, the base station management module and the biometric recognition background may both have the need not to expose their own data. Therefore, several different comparison methods are described below to meet the needs of all parties.

(1) Plaintext Comparison

The first mode of plaintext comparison is to transfer the mobile phone number list from the biometric recognition background to the base station management module. The base station management module compares and returns the intersection of the mobile phone number lists. Finally, the biometric recognition background again compares the intersection.

Figure 5:
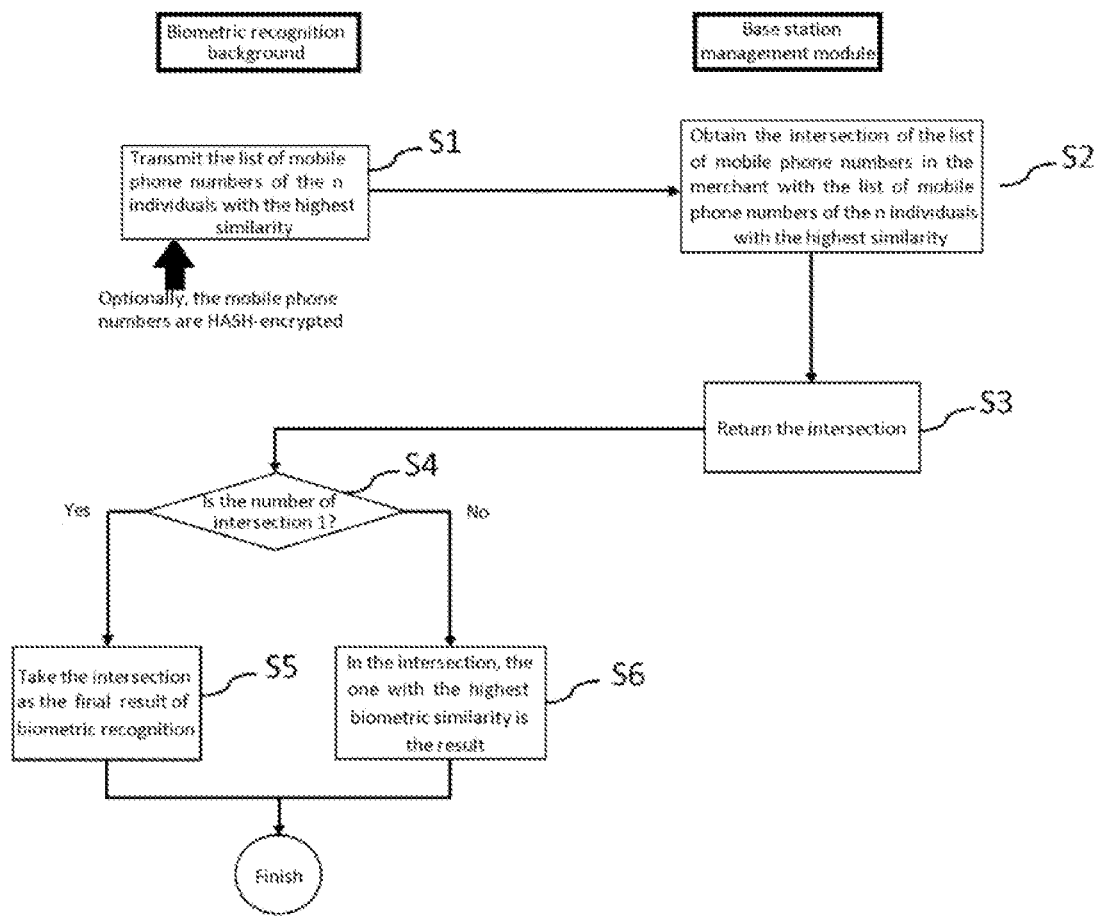
FIG. 5 is a schematic flowchart showing a biometric-based identity authentication method according to a first mode of the plaintext comparison method.

FIG. 5 is a schematic flowchart showing a biometric-based identity authentication method according to a first mode of the plaintext comparison method.

As shown in FIG. 5, in step S1, the biometric recognition background obtains the biometrics of users recognized by the biometric recognition terminal. Based on the pre-established binding relationship between biometrics of users and mobile phone numbers, the biometric recognition background obtains a mobile phone number list composed of n mobile phone numbers with the highest similarity to the biometrics and send the mobile phone number list to the base station management module, where n is a natural number greater than 1.

In step S2, after the user enters the base station associated with the merchant, the base station management module obtains the mobile phone number list of the users entering the merchant (this step can be performed before step S1), and then the base station management module compares the intersection of the mobile phone number list entering the merchant with the mobile phone number list composed of n mobile phone numbers of users with the highest similarity sent from the biometric recognition background. The intersection of the two is returned to the biometric recognition background in step S3.

In step S4, the biometric recognition background determines whether the intersection of the two is one mobile phone number. On the condition that the intersection of the two is one mobile phone number, then go to step S5, and the intersection is the final result of biometric recognition, that is, the user of the mobile phone number is the user with successful identity authentication. On the condition that the intersection of the two is more than one number, then go to step S6, and the one with the highest biometric similarity in the intersection is regarded as the final result of biometric recognition, that is, the user with the mobile phone number with the highest biometric similarity in the intersection is the user with successful identity authentication.

As an alternative, during the comparison, an encryption operation (such as HASH, etc.) will be performed on the n mobile phone numbers of the users with the highest similarity recognized by the biometric recognition background. Likewise, the base station management module also performs the same encryption operation on the mobile phone numbers in its list. By comparing the encrypted mobile phone number lists, it can ensure that the biometric recognition background does not expose the real data to the base station management module, that is, it can ensure that the base station management module will not know the final biometric recognition result, namely, the individual that finally completes the transaction.

The second mode of plaintext comparison is that the base station management module transfers the mobile phone number lists to the biometric recognition background, and the biometric recognition background compares the mobile phone number lists and the intersection of the mobile phone number lists.

Figure 6:
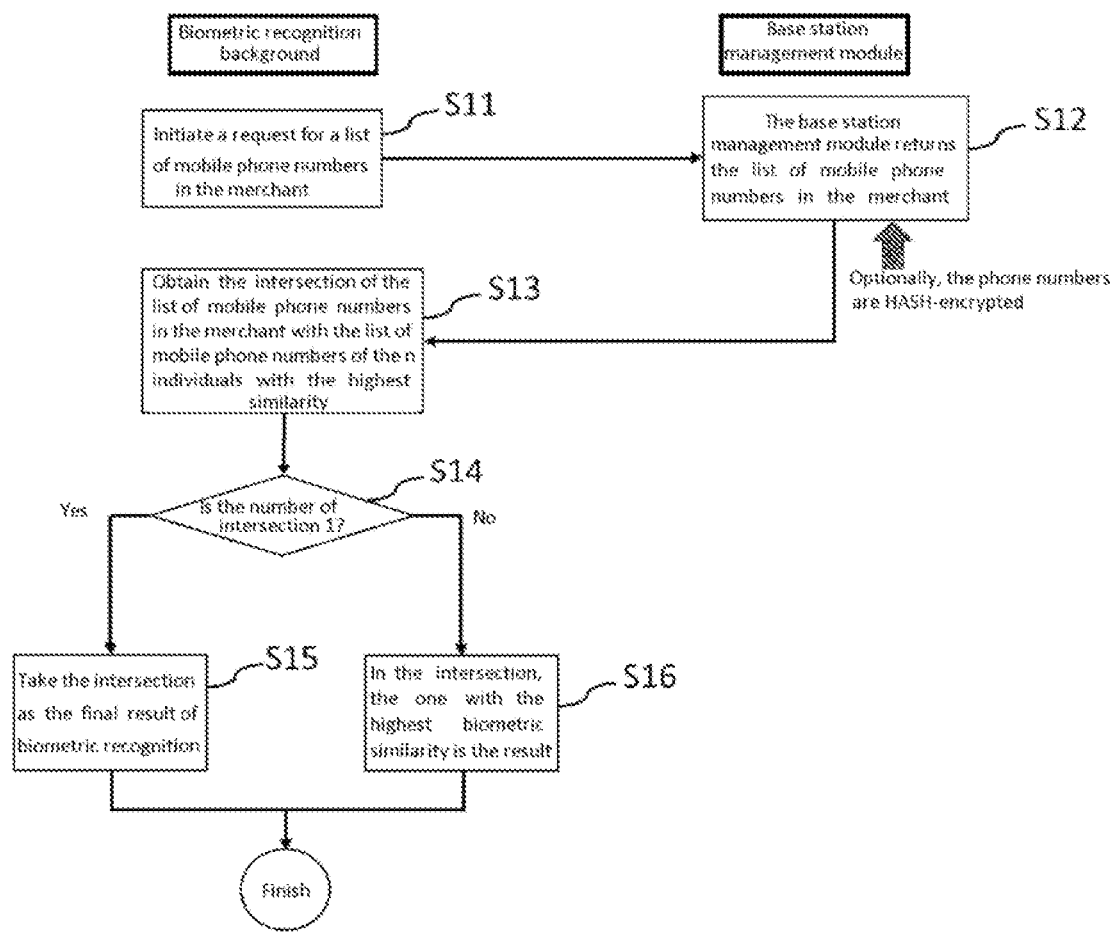
FIG. 6 is a schematic flowchart showing a biometric-based identity authentication method according to a second mode of the plaintext comparison method.

FIG. 6 is a schematic flowchart showing a biometric-based identity authentication method according to a second mode of the plaintext comparison method.

As shown in FIG. 6, in step S11, the biometric recognition background initiates to the base station management module a request to obtain a list of mobile phone numbers entering the merchant. In step S12, the base station management module returns the list of mobile phone numbers entering the merchant. In step S13, the biometric recognition background obtains the biometrics of the users recognized by the biometric recognition terminal, and obtains a mobile phone number list composed of n mobile phone numbers with the highest similarity to the biometrics based on the pre-established binding relationship between the biometrics of users and the mobile phone numbers. Then, the biometric recognition background compares the mobile phone number list of the n mobile phone numbers with the highest biometric similarity with the list of mobile phone numbers entering the merchant sent from the base station management module to determine if there is an intersection. In step S14, it is determined whether the intersection of the two is one mobile phone number, wherein on the condition that the intersection of the two is one mobile phone number, then go to step S15, and it is determined that the user of the mobile phone number is the user with successful identity authentication, and on the condition that the intersection of the two is more than one number, then go to step S16, and it is determined that the user with the mobile phone number with the highest biometric similarity in the intersection is the user with successful identity authentication.

As an alternative, similar to the first mode, the base station management module can perform an encryption operation (such as HASH, etc.) on the mobile phone numbers on its list before transmitting. The same encryption operation is also performed on the mobile phone numbers in the biometric recognition list to complete the comparison. This method can ensure that the base station management module does not expose its own data.

(2) Obfuscation Comparison

A first mode of obfuscation comparison is to transfer a mobile phone number list with the addition of m random mobile phone numbers for obfuscation to the base station management module by the biometric recognition background. The base station management module compares and returns the intersection of the mobile phone number lists. Finally, the biometrics recognition background again compares the intersection.

Figure 7:
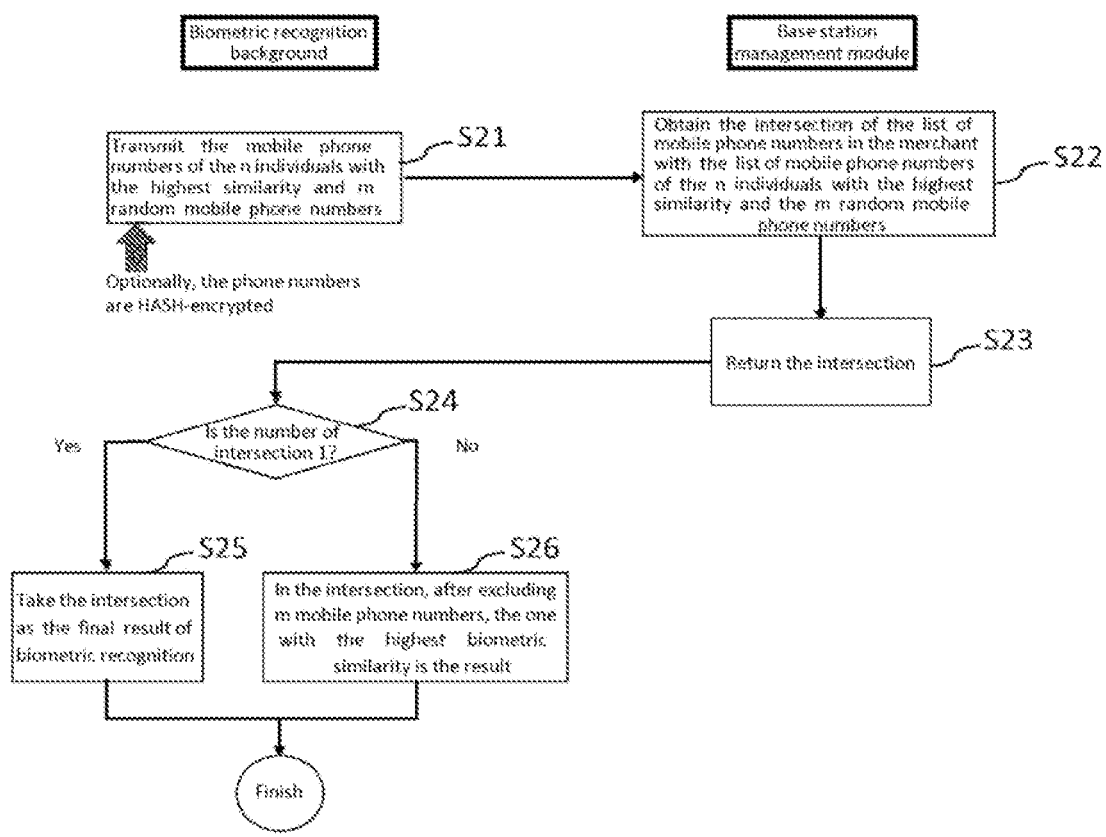
FIG. 7 is a schematic flowchart showing a biometric-based identity authentication method according to the obfuscation comparison method.

FIG. 7 is a schematic flowchart showing a biometric-based identity authentication method according to an obfuscation comparison mode.

As shown in FIG. 7, in step S21, the biometric recognition background obtains the biometrics of users recognized by the biometric recognition terminal. Based on the pre-established binding relationships between biometrics of users and the mobile phone numbers, the biometric recognition background obtains a mobile phone number list composed of n mobile phone numbers with the highest similarity to the biometrics, and packs the n mobile phone numbers with high similarity and other m randomly generated mobile phone numbers into one list for sending to the base station management module, where n is a natural number greater than 1, and m is a natural number.

In step S22, after the user enters the coverage area of the base station associated with the merchant, the base station management module obtains the list of mobile phone numbers of the users entering the merchant (this step can be performed before step S21). And then, the base station management module compares the list of mobile phone numbers entering the merchant with the mobile phone number list composed of n mobile phone numbers of the users with the highest similarity and m random mobile phone numbers sent from the biometric recognition background, to find the intersection of the two. In step S23, the intersection of the two is returned to the biometric recognition background.

In step S24, the biometric recognition background determines whether the intersection of the two is one mobile phone number. On the condition that the intersection of the two is one mobile phone number, then go to step S25, and it is determined that the user of the mobile phone number is the final biometric recognition result, that is, the user with successful identity authentication. On the condition that the intersection of the two is more than one number, then go to step S26. For the intersection, after excluding m random mobile phone numbers, the one with the highest biometric similarity is regarded as the final result, that is, the user with the mobile phone number having the highest biometric similarity is regarded as the user with successful identity authentication.

The obfuscation comparison method is compared with the plaintext comparison method. Since m random mobile phone numbers are deliberately confused with n mobile phone numbers with high biometric similarity, the base station management module cannot obtain the accurate n mobile phone numbers with high biometric similarity.

As an alternative, during the comparison, the biometric recognition background will perform an encryption operation (such as HASH, etc.) on the n mobile phone numbers of the users with the highest similarity and the m random mobile phone numbers. Likewise, the base station management module will also perform the same encryption operation on the mobile phone numbers on its list. By comparing the encrypted mobile phone number lists, it can ensure that the biometric recognition background does not expose the real data to the base station management module, that is, it can ensure that the base station management module will not know the final biometric recognition result, namely, the individual that finally completes the transaction.

(3) Fuzzy Comparison

A first mode of the fuzzy comparison method is that the biometric recognition background does not transmit a complete list of mobile phone numbers, but transmits fixed digits out of the mobile phone numbers to the base station management module. The base station management module compares the received mobile phone number list having fixed digits with the mobile phone number list having fixed digits out of the mobile phone numbers entering the merchant obtained from the base station, and returns the intersection of the two lists to the biometric recognition background. The intersection thereof is then compared by the biometric recognition background.

Figure 8:
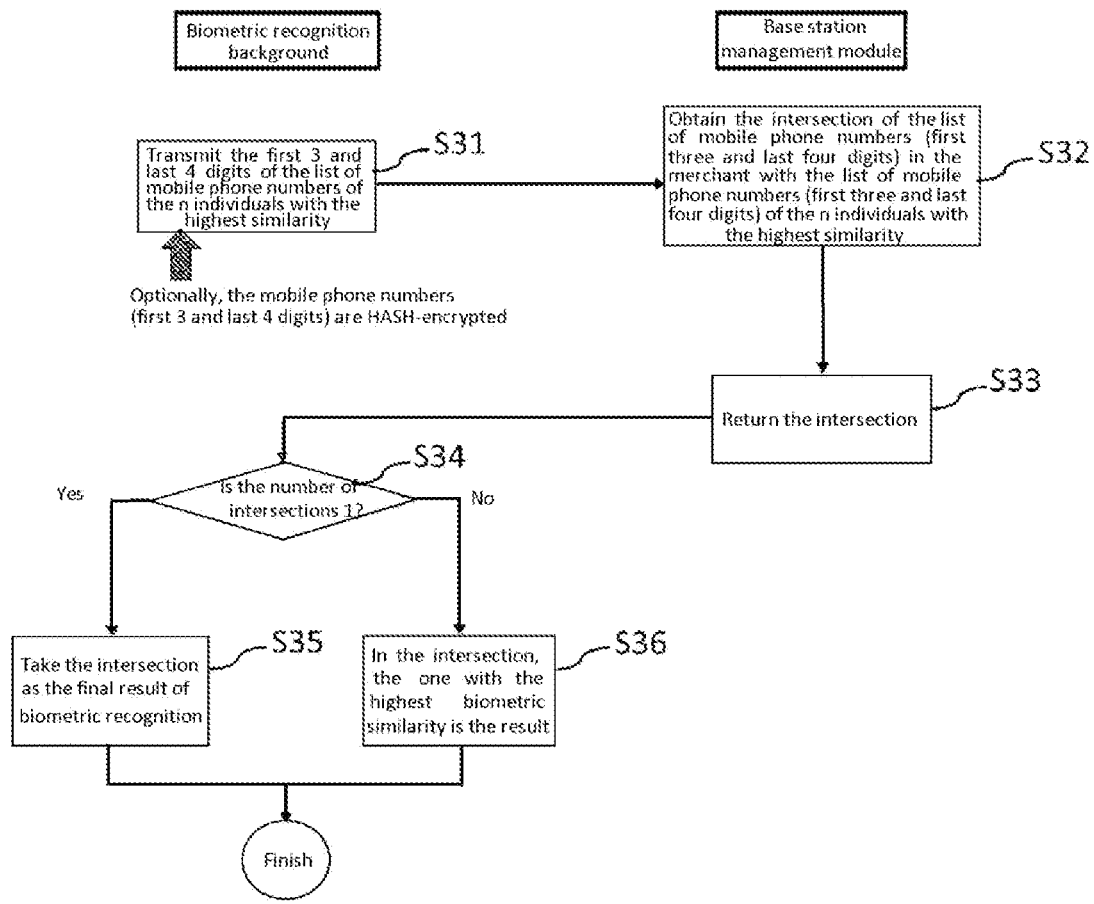
FIG. 8 is a schematic flowchart showing a biometric-based identity authentication method according to a first mode of the fuzzy comparison method.

FIG. 8 is a schematic flowchart showing a biometric-based identity authentication method according to a first mode of the fuzzy comparison method.

As shown in FIG. 8, in step S31, the biometric recognition background obtains the biometrics of users recognized by the biometric recognition terminal. Based on the pre-established binding relationship between biometrics of users and the mobile phone numbers, the biometric recognition background obtains a mobile phone number list composed of n mobile phone numbers with the highest similarity to the biometrics, where a complete mobile phone number is not transmitted here, but fixed digits of a mobile phone number (such as the first three and last four digits) are transmitted to the base station management module.

In step S32, after the user enters the base station associated with the merchant, the base station management module obtains the list of mobile phone numbers of the users entering the merchant (this step can be performed before step S31). Here, fixed digits (such as the first three and last four digits) are also taken out from the list of mobile phone numbers of the users entering the merchant. Then, the base station management module compares the list of mobile phone numbers (such as the first three and last four digits) entering into the merchant with the list composed of n mobile phone numbers (such as the first three and last four digits) of the users with the highest similarity sent from the biometric recognition background to obtain the intersection of the two. In step S33, the intersection of the two is returned to the biometric recognition background.

In step S34, the biometric recognition background determines whether the intersection of the two is one mobile phone number. On the condition that the intersection of the two is one mobile phone number, then go to step S35, and it is determined that the user of the mobile phone number is the final biometric recognition result, namely, the user with successful identity authentication; on the condition that the intersection of the two is more than one number, then go to step S36, and for intersection, the one with the highest biometric similarity is regarded as the final result, that is, the user with the mobile phone number with the highest biometric similarity is regarded as the user with successful identity authentication.

As an alternative, during the comparison, the biometric recognition background will perform an encryption operation (such as HASH, etc.) on the fixed digits (such as the first three and last four digits) of the n phone numbers of the users with the highest similarity. Likewise, the base station management module also performs the same encryption operation on the fixed digits (such as the first three and last four digits) of the mobile phone numbers on its list.

The advantage of the fuzzy comparison method is that the base station management module and the biometric recognition background cannot mutually determine the accurate mobile phone number list owned by the other party.

A second mode of fuzzy comparison is that the base station management module transfers mobile phone number lists to the biometric recognition background, and the biometric recognition background compares the mobile phone number lists and the intersection of the mobile phone number lists.

Figure 9:
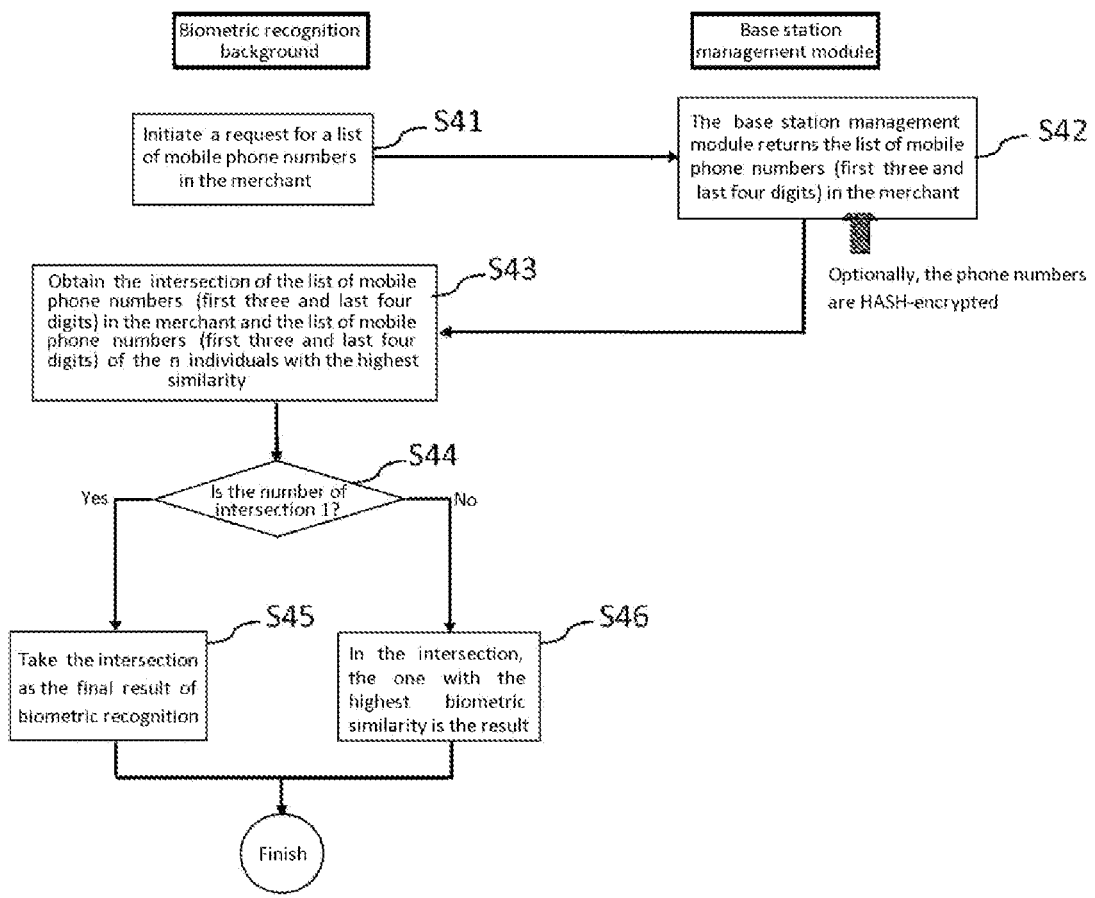
FIG. 9 is a schematic flowchart showing a biometric-based identity authentication method according to a second mode of the plaintext comparison method.

FIG. 9 is a schematic flowchart showing a biometric-based identity authentication method according to a second mode of the fuzzy comparison method.

As shown in FIG. 9, in step S41, the biometric recognition background initiates to the base station management module a request to obtain a list of mobile phone numbers entering the merchant. In step S42, the base station management module returns the list of mobile phone numbers entering the merchant, where the complete mobile phone number is not returned but the fixed digits of the mobile phone number (such as the first three and last four digits). In step S43, the biometric recognition background obtains the biometrics of the users recognized by the biometric recognition terminal, and obtains a mobile phone number list composed of n mobile phone numbers with the highest similarity to the biometrics based on the pre-established binding relationship between the biometrics of users and the mobile phone numbers. Here, the complete mobile phone number is not obtained but the fixed digits of the mobile phone number (such as the first three and last four digits). Then, the biometric recognition background compares the mobile phone number list composed of the n mobile phone numbers (such as the first three and last four digits) with the highest similarity to the biometrics with the mobile phone number list (such as the first three and last four digits) entering the merchant sent from the base station management module to determine if there is an intersection. In step S44, it is determined whether the intersection of the two is one mobile phone number, wherein on the condition that the intersection of the two is one mobile phone number, then go to step S45, determining that the user of the mobile phone number is the user with successful identity authentication, and on the condition that the intersection of the two is more than one number, then go to step S46, determining that the user with the mobile phone number with the highest biometric similarity in the intersection is the user with successful identity authentication.

As an alternative, the base station management module can perform an encryption operation (such as HASH, etc.) on the fixed digits (such as the first three and last four digits) of the mobile phone numbers on its list and then transmit them. The same encryption operation is also performed on the fixed digits (such as the first three and last four digits) of the mobile phone numbers in the biometric recognition list to complete the comparison.

The advantage of this mode includes that the base station management module will not know the final biometric recognition result, either (i.e., the individual that finally completes the transaction), in addition to that the base station management module and the biometric recognition background cannot mutually determine the accurate mobile phone number list owned by the other party.

(4) Obfuscation and Fuzzy Comparison

Obfuscation and fuzzy comparison combines the two methods of obfuscation comparison and fuzzy comparison.

Figure 10:
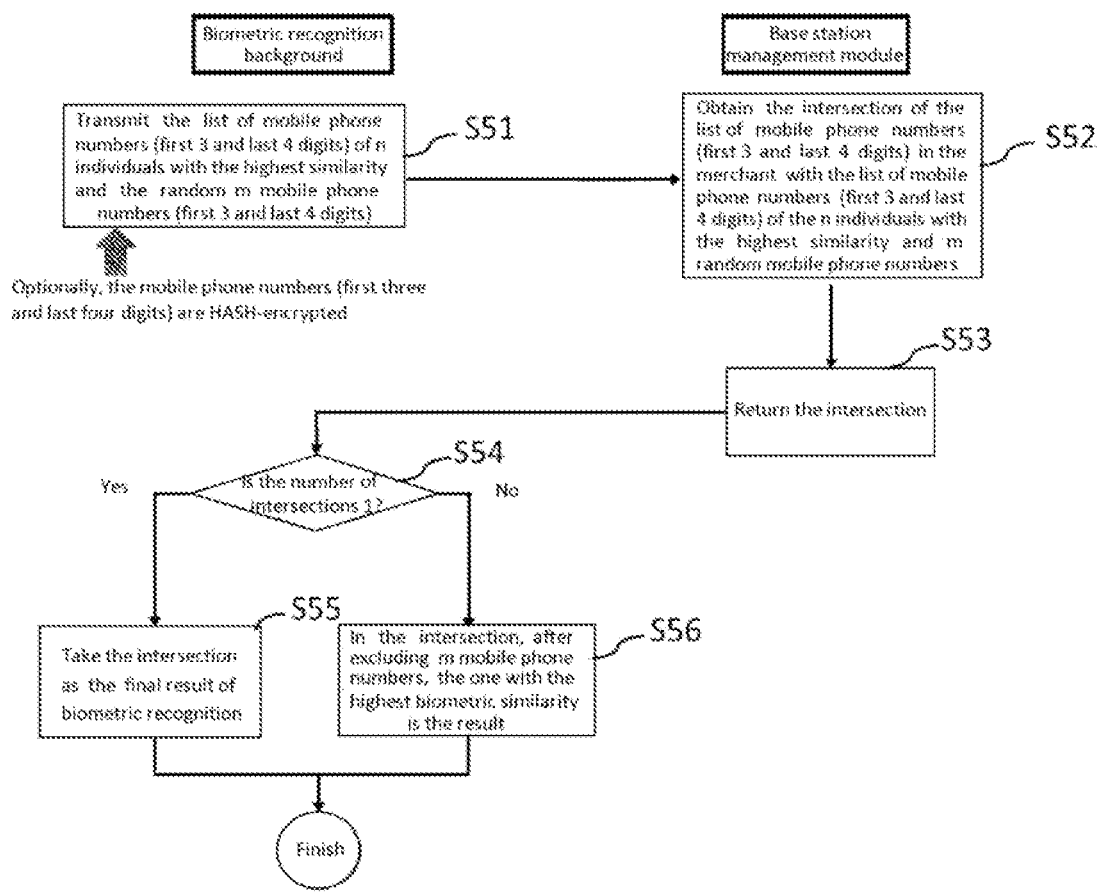
FIG. 10 is a schematic flowchart showing a biometric-based identity authentication method according to an obfuscation and fuzzy comparison method.

FIG. 10 is a schematic flowchart showing a biometric-based identity authentication method according to the obfuscation and fuzzy comparison method.

As shown in FIG. 10, in step S51, the biometric recognition terminal obtains the biometrics of users recognized by the biometric recognition terminal. Based on the pre-established binding relationship between the biometrics of users and the mobile phone numbers, the biometric recognition background obtains a mobile phone number list composed of fixed digits (such as the first three and last four digits) of the n mobile phone numbers with the highest similarity to the biometrics, and packs the fixed digits (such as the first three and last four digits) of the n mobile phone numbers with high similarity and the fixed digits (such as the first three and last four digits) of other m randomly generated mobile phone numbers into one list for sending to the base station management module, where n is a natural number greater than 1, and m is a natural number.

In step S52, after the user enters the base station associated with the merchant, the base station management module obtains the mobile phone number list of the users entering the merchant (this step can be performed before step S51), and only fixed digits (such as the first three and last four digits) in the mobile phone number are taken as the mobile phone number list. Then, the base station management module compares the list of fixed digits (such as the first three and last four digits) of the mobile phone numbers entering the merchant with the mobile phone number list composed of fixed digits (such as the first three and last four digits) of n mobile phone numbers of the users with the highest similarity and fixed digits (such as the first three and last four digits) of m random mobile phone numbers sent from the biometric recognition background, to obtain the intersection of the two. In step S53, the intersection of the two is returned to the biometric recognition background.

In step S54, the biometric recognition background determines whether the intersection of the two is one mobile phone number. On the condition that the intersection of the two is one mobile phone number, then go to step S5, determining that the user of the mobile phone number is the final biometric recognition result, namely, the user with successful identity authentication. On the condition that the intersection of the two is more than one number, then go to step S56, for the intersection, after excluding m random mobile phone numbers, the one with the highest biometric similarity is regarded as the final result, that is, the user with the highest biometric similarity is regarded as the user with successful identity authentication.

As an alternative, during the comparison, the biometric background will perform an encryption operation (such as HASH, etc.) on the fixed digits (such as the first three digits or the last four digits) of the n mobile phone numbers of the users with the highest similarity recognized and the fixed digits (such as the first three and last four digits) of m random mobile phone numbers. Likewise, the base station management module also performs the same encryption operation on the fixed digits (such as the first three and last four digits) of the mobile phone numbers on its list. By comparing the encrypted mobile phone number lists, identity authentication is completed.

In this mode, in addition to the fact that the base station management module and the biometric recognition background cannot mutually determine the accurate mobile phone number list owned by the other party, the base station management module cannot know the final face recognition result either (i.e., the individual that finally completes the transaction).

Hereinafter, specific embodiments of the biometric-based identity authentication method and the biometric-based identity authentication system of the present application will be described.

User registration is required before recognition. Through registration, the user binds the user's mobile phone number with the bank card and face. In the registration phase, the biometric-based identity authentication system of the present application collects the following information:

(1) User Identity Information

Collect user identity information, including name, mobile phone number, and ID number. It is used to verify the uploaded face photos and display the face recognition results (desensitization) during registration.

(2) User Face Information

That is, the user's face photo. After the verification is passed, it will be stored in the database and used as a comparison sample for face recognition.

(3) Bank Card Information

Bank card information includes name, bank card number, mobile phone number reserved in bank, SMS verification code and the like, used to verify the validity of the bank card at the issuing bank. After the user enters and exits the gate, the system will deduct the fee from the bound card through the recognition result. Among them, during the registration process, first, user identity information is collected, and then the face photo is uploaded. The system verifies the user identity information and face photo information through the public security system. After the verification is passed, the user's bank card information is further collected, and the bank card elements are sent by the system to the card issuing bank for verification. After the verification is passed, the collected user identity information (mobile phone number), face information and bank card information are bound.

In the following embodiments, a human face is taken as an example of a biological feature. However, there can also be various modifications. For example, human face may not be uploaded during registration, instead, for example, a finger vein biometric image or iris or palm print may be collected. In the case of collecting finger vein biometric images, the user's finger is placed on the finger vein collector to collect the image when the user passes through the gate, and the image is uploaded, or it can be searched and compared in the database.

The specific embodiments of the biometric-based identity authentication method and the biometric-based identity authentication system of the present application will be described below.

First Embodiment (First Mode of Plaintext Comparison Method)

Figure 11:
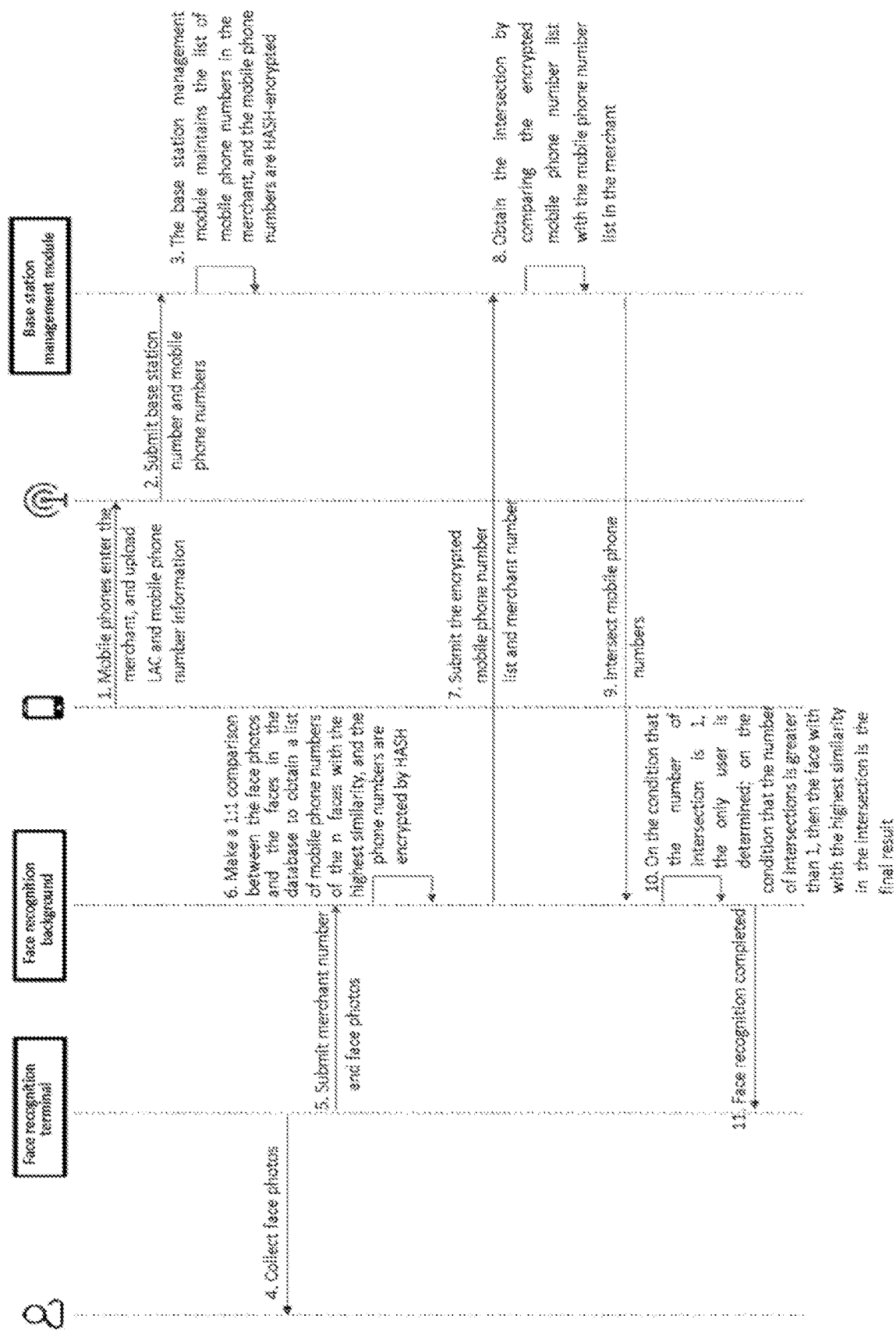
FIG. 11 is a schematic flowchart showing a biometric-based identity authentication method of the first embodiment.

FIG. 11 is a schematic flowchart showing a biometric-based identity authentication method of the first embodiment.

As shown in FIG. 11, the biometric-based identity authentication method of the first embodiment includes the following steps:

1. After the user enters the merchant, the mobile phone sends the LAC and mobile phone number information to the base station, where LAC refers to geographic location update information, that is, when the mobile phone receives the signal broadcast by the base station, and finds that the base station signal it originally received is different from the broadcast signal it currently receives, it will upload the information;

2. The base station (represented by the symbol between the mobile phone and the base station management module in FIG. 11) sends the mobile phone number and base station number to the base station management module (equivalent to an operator);

3. The base station management module dynamically maintains a list of mobile phone numbers in the merchant based on the base station number, and the mobile phone number is HASH-encrypted;

4. The face recognition terminal collects faces;

5. The face recognition terminal uploads the merchant number and faces to the face recognition background;

6. The face recognition background performs a 1:1 comparison of the faces and the faces in the face database to obtain the n mobile phone numbers of the faces with the highest similarity, and each mobile phone number is HASH-encrypted;

7. The face recognition background performs a HASH encryption on the n mobile phone numbers and transmits them to the base station management module;

8. The base station management module compares the HASH values of the mobile phone numbers on the list it maintains with the HASH values of the mobile phone numbers sent by the face recognition background to obtain the intersected mobile phone numbers;

9. The intersected mobile phone numbers (HASH values) are returned to the face recognition background;

10. On the condition that the intersection is 1, the only user is determined; on the condition that the intersection is greater than 1, the face with the highest similarity in the intersection is the final result.

Figure 12:
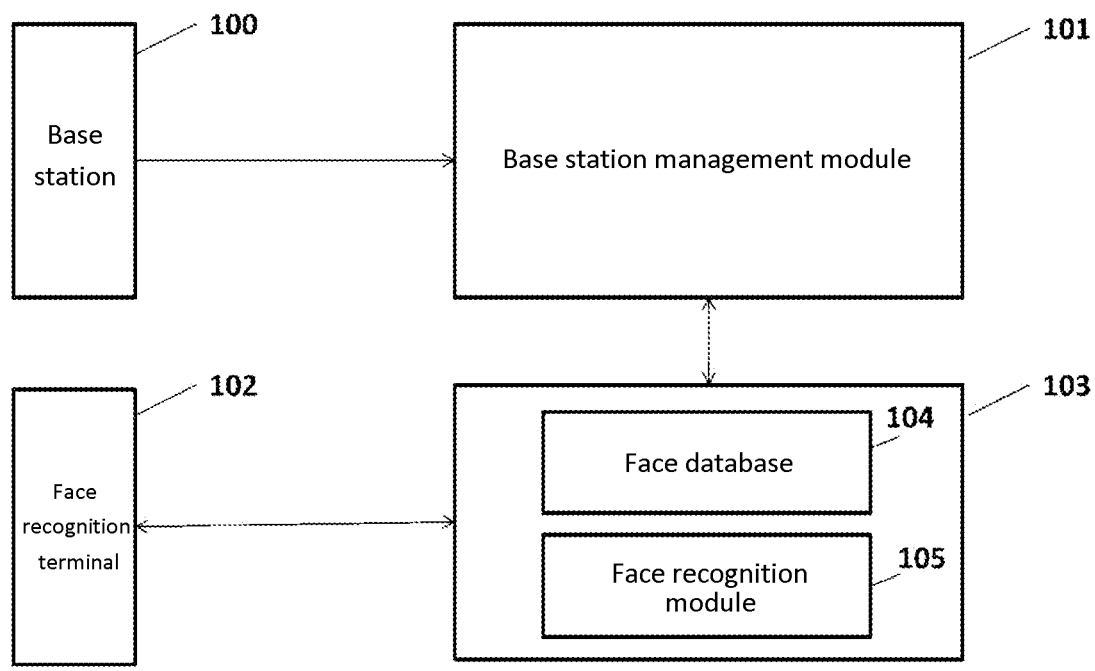
FIG. 12 is a block diagram showing the structure of a biometric-based identity authentication system of the first embodiment.

FIG. 12 is a block diagram showing the structure of a biometric-based identity authentication system of the first embodiment.

As shown in FIG. 12, the face-based identity authentication system of the first embodiment includes:

a base station 100 configured to obtain in real time the mobile phone numbers of users entering the coverage area of the base station 100, and send the mobile phone numbers of the users and identification number of the base station to the base station management module 101 below;

a base station management module 101 configured to receive mobile phone numbers of the users and the identification number of the base station from the base station 100, and obtain the mobile phone numbers of all users entering the merchant based on the merchant number sent from a face recognition background 103 described below and according to the pre-stored association relationship between the identification number of the base station and the merchant number, to generate a first mobile phone number list;

a face recognition terminal 102 configured to obtain the faces of the users;

a face recognition background 103 including a face database 104 used to pre-store the binding relationship between the users' faces and mobile phone numbers and a face recognition module 105, configured to obtain a second mobile phone number list composed of n mobile phone numbers with the highest similarity to the users' faces recognized by the face recognition terminal based on the binding relationship, and send the second mobile phone number list and merchant number to the base station management module 101, where n is a natural number greater than 1;

wherein, the base station management module 101 receives the second mobile phone number list sent by the face recognition background 103, compares the first mobile phone number list with the second mobile phone number list, and returns the intersection of the two to the face recognition background 103; the face recognition module 105 of the face recognition background 103 determines the intersection of the two received, wherein on the condition that the intersection of the two is one mobile phone number, it is determined that the mobile phone number of the user is the user with successful identity authentication, and on the condition that the intersection of the two is more than one number, it is determined that the user with the mobile phone number with the highest facial similarity in the intersection is the user with successful identity authentication.

Further, the base station management module 101 includes the following sub-modules (not shown):

a first receiving module configured to receive the mobile phone numbers of the users entering the coverage area of the base station and the identification number of the base station sent from the base station 100;

a base station database configured to the pre-store the association relationship between the identification number of the base station and the merchant number;

a second receiving module configured to receive from the outside (i.e., the face recognition background 103) the second mobile phone number list and the merchant number;

a first comparison processing module configured to obtain, according to the association relationship stored in the base station database, and based on the users' mobile phone numbers and the identification number of the base station received from the first receiving module and the merchant number received from the second receiving module, the mobile phone numbers of all users entering the merchant to generate the first mobile phone number list;

a second comparison processing module configured to compare the first mobile phone number list with the second mobile phone number list, and obtain the intersection of the two.

Wherein, optionally, the base station management module 101 can perform a HASH encryption operation on the first mobile phone number list sent from the base station 100. Correspondingly, the face recognition background 103 can also perform a HASH encryption operation on the second mobile phone number list. In this way, the base station management module 101 compares the results of the two after the HASH encryption operation is performed thereon.

Second Embodiment (Second Mode of Plaintext Comparison Method)

Figure 13:
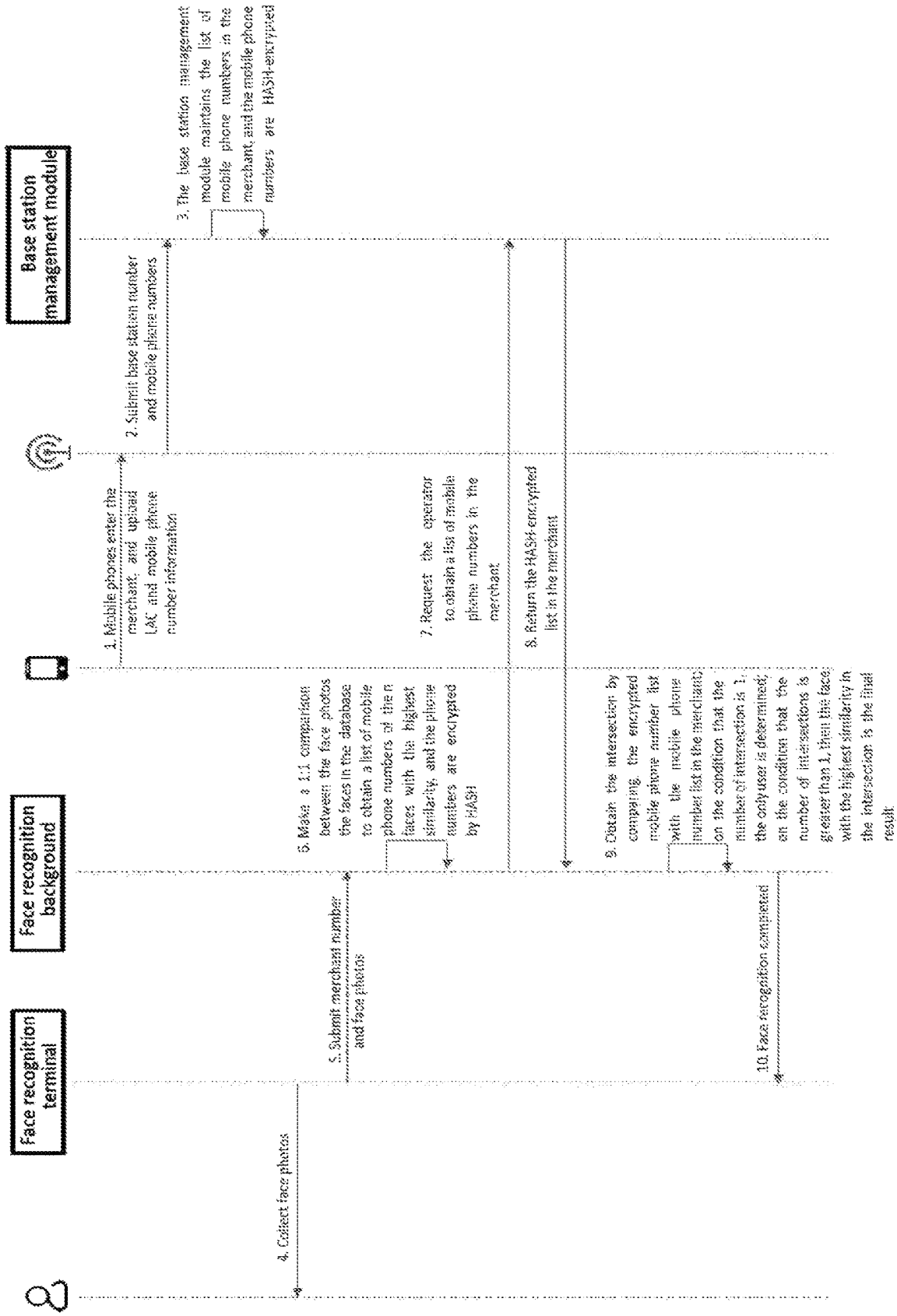
FIG. 13 is a schematic flowchart showing a biometric-based identity authentication method of the second embodiment.

FIG. 13 is a schematic flowchart showing a biometric-based identity authentication method of the second embodiment.

As shown in FIG. 13, the biometric-based identity authentication method of the second embodiment includes the following steps:

1. After the user enters the merchant, the mobile phone sends the location update information and mobile phone number information to the base station;

2. The base station sends the mobile phone numbers and base station number to the base station management module;

3. The base station management module dynamically maintains a list of mobile phone numbers in the merchant based on the base station number, and the phone numbers are HASH-encrypted;

4. The face recognition terminal collects faces;

5. The face recognition terminal uploads the merchant number and faces to the face recognition background;

6. The face recognition background performs a 1:1 comparison of the faces and the faces in the face database to obtain n phone numbers of the faces with the highest similarity, wherein each mobile phone number is HASH-encrypted;

7. The face recognition background requests the base station management module to obtain a list of mobile phone numbers in the merchant;

8. The base station management module returns the list of HASH-encrypted mobile phone numbers in the merchant to the face recognition background;

9. The face recognition background obtains the intersection of the list of mobile phone numbers in the merchant and the list of n mobile phone numbers of the faces with the highest similarity. On the condition that the intersection is 1, the only user is determined. On the condition that the intersection is greater than 1, the face with the highest similarity in the intersection is the final result;

10. Face recognition is completed.

Figure 14:
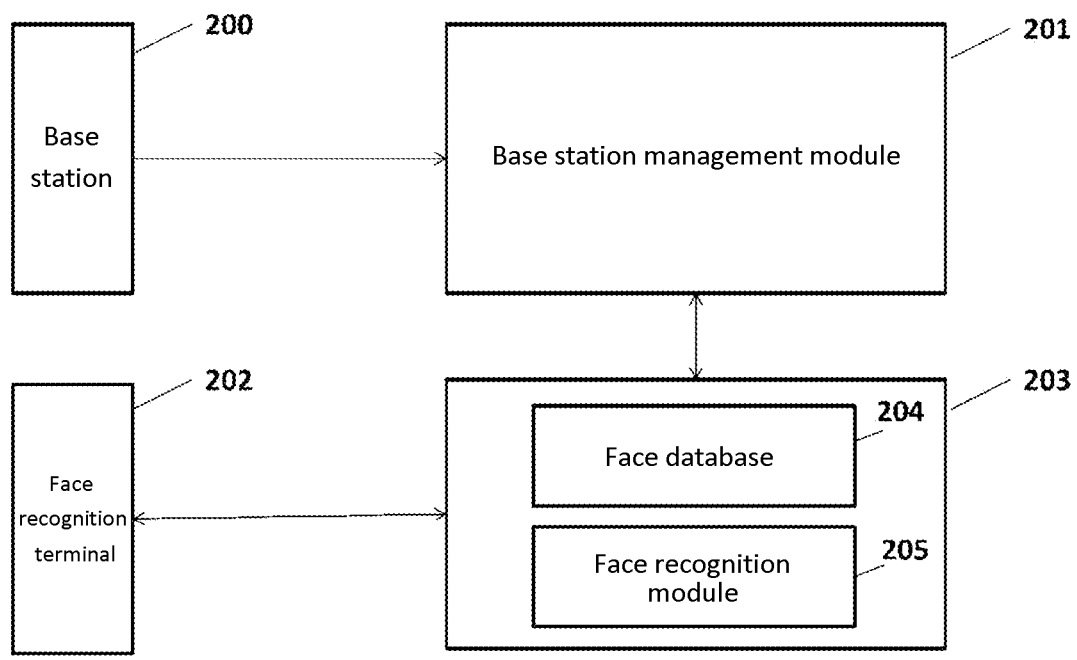
FIG. 14 is a block diagram showing the structure of a biometric-based identity authentication system of the second embodiment.

FIG. 14 is a block diagram showing the structure of a biometric-based identity authentication system of the second embodiment.

As shown in FIG. 14, the face-based identity authentication system of the second embodiment includes:

a base station 200 configured to obtain in real time the mobile phone numbers of the users entering the coverage area of the base station, and send the mobile phone numbers of the users and the identification number of the base station to a base station management module 201 below;

a base station management module 201 configured to receive users' mobile phone numbers and the identification number of the base station from the base station 200, obtain the mobile phone numbers of all users entering the merchant according to the pre-stored association relationship between the identification number of the base station and the merchant to generate a first mobile phone number list, and send the first mobile phone number list to a face recognition background 203 below;

a face recognition terminal 202 configured to obtain the faces of users;

a face recognition background 203 including a face database 204 used to pre-store the binding relationship between the users' faces and the mobile phone numbers and a face recognition module 205, configured to obtain, based on the binding relationship, a second mobile phone number list composed of n mobile phone numbers with the highest similarity to the faces of the users recognized by the face recognition terminal, where n is a natural number greater than 1. On the other hand, the first mobile phone number list sent by the base station management module 201 is received, and the first mobile phone number list is compared with the second mobile phone number list. On the condition that the intersection of the two is one mobile phone number, it is determined that the user of the mobile phone number is the user with successful identity authentication. On the condition that the intersection of the two is more than one number, it is determined that the user with the mobile phone number with the highest facial similarity in the intersection is the user with successful identity authentication.

Among them, optionally, the base station management module 201 can perform a HASH encryption operation on the first mobile phone number list sent from the base station 200. Correspondingly, the face recognition background 203 can also perform a HASH encryption operation on the second mobile phone number list, and compare the two after the HASH encryption operation is performed thereon.

Third Embodiment (First Mode of Obfuscation Comparison Method)

Figure 15:
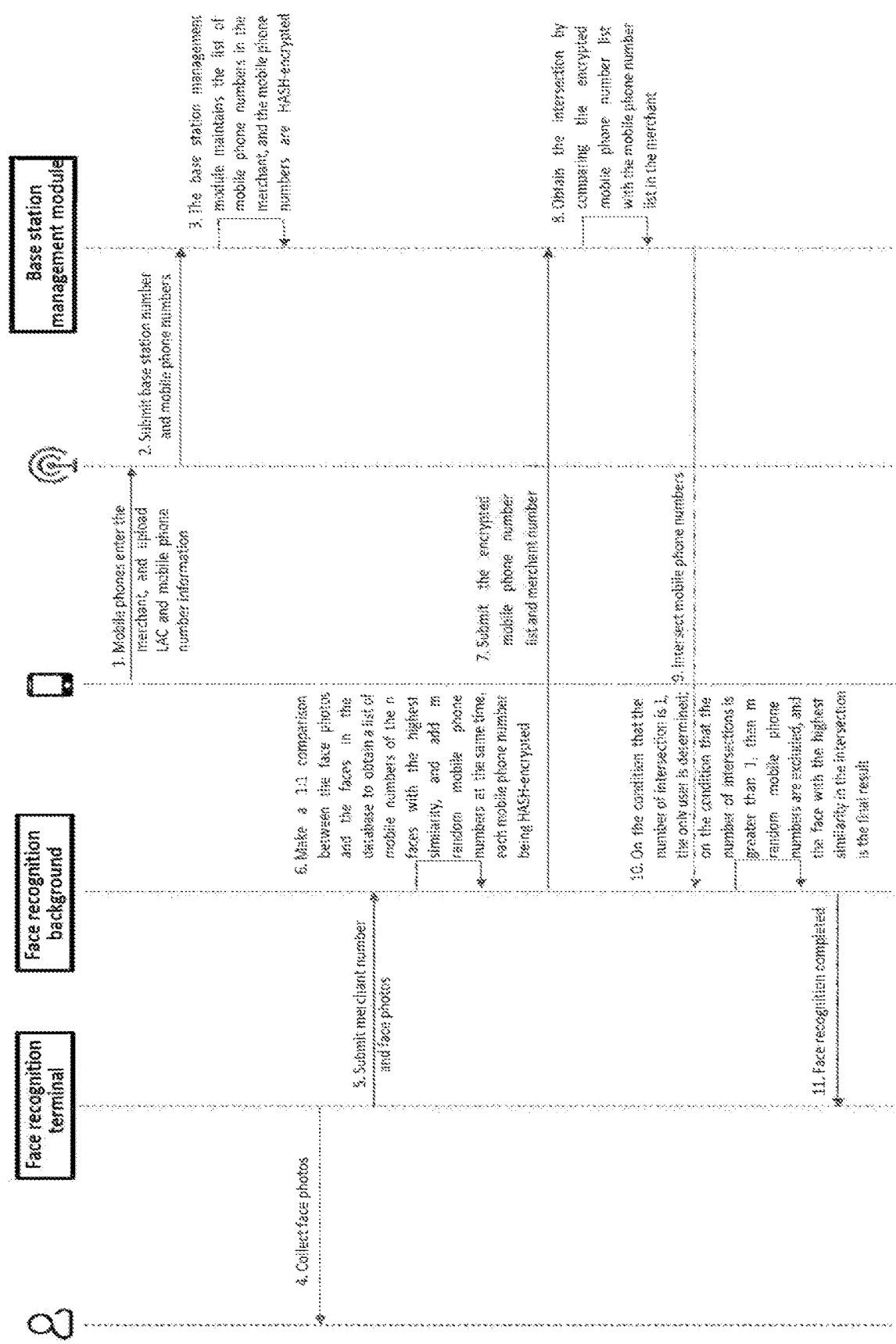
FIG. 15 is a schematic flowchart showing a biometric-based identity authentication method of the third embodiment.

FIG. 15 is a schematic flowchart showing a biometric-based identity authentication method of the third embodiment.

As shown in FIG. 15, the biometric-based identity authentication method of the third embodiment includes the following steps:

1. After the user enters the merchant, the mobile phone sends the location update information and mobile phone number information to the base station;
2. The base station sends the mobile phone numbers and base station number to the base station management module;
3. The base station management module dynamically maintains a list of mobile phone numbers in the merchant based on the base station number, and the phone numbers are HASH-encrypted;
4. The face recognition terminal collects faces;
5. The face recognition terminal uploads the merchant number and faces to the face recognition background;
6. The face recognition background performs a 1:1 comparison between the faces and the faces in the face database to obtain n mobile phone numbers of the faces with the highest similarity, while randomly generates m mobile phone numbers for obfuscation to form a list, wherein each mobile phone number is HASH-encrypted, where m is a natural number;
7. The face recognition background transmits the n HASH-encrypted mobile phone numbers and m mobile phone numbers for obfuscation to the base station management module;
8. The base station management module compares the mobile phone number list maintained by it with the mobile phone number list sent by the face recognition background to obtain the intersection;
9. The intersection is returned to the face recognition background;
10. On the condition that the intersection is 1, the only user is confirmed. On the condition that the intersection is greater than 1, the face with the highest similarity in the intersection is the final result;
11. Face recognition is completed.

Figure 16:
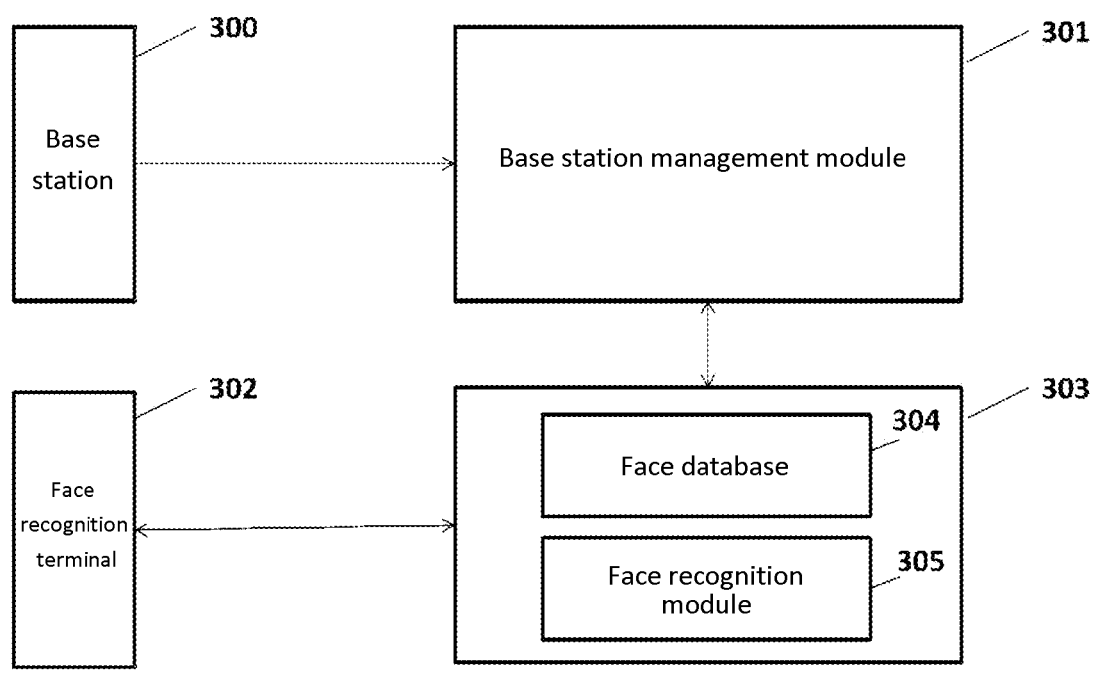
FIG. 16 is a block diagram showing the structure of a biometric-based identity authentication system of the third embodiment.

FIG. 16 is a block diagram showing the structure of a biometric-based identity authentication system of the third embodiment.

As shown in FIG. 16, the biometric-based identity authentication system of the third embodiment includes:

a base station 300 configured to obtain in real time the mobile phone numbers of users entering the coverage area of the base station, and send the mobile phone numbers of the users and the identification number of the base station to a base station management module 301 below;

a base station management module 301 configured to receive users' mobile phone numbers and the identification number of the base station from the base station 300, and obtains, according to the pre-stored association relationship between the identification number of the base station and the merchant number of the merchant, the mobile phone numbers of all users entering the merchant to generate a first mobile phone number list;

a face recognition terminal 302 configured to obtain the faces of the users;

a face recognition background 303 including a face database 304 used to pre-store the binding relationship between the users' faces and the mobile phone numbers and a face recognition module 305, configured to obtain, based on the binding relationship, a second mobile phone number list composed of n mobile phone numbers with the highest similarity to users' faces recognized by the face recognition terminal, where n is a natural number greater than 1, wherein the second mobile phone number list further includes m randomly generated mobile phone numbers for obfuscation, where m is a natural number, and the second mobile phone number list is sent to the base station management module 301.

Wherein, the base station management module 301 receives the second mobile phone number list sent by the face recognition background 303, compares the first mobile phone number list with the second mobile phone number list, and returns the intersection of the two to the face recognition background 303. For the intersection of the two received, the face recognition module 305 in the face recognition background 303 first excludes m mobile phone numbers for obfuscation, and then makes a determination. On the condition that the intersection of the two is one mobile phone number, it is determined that the mobile phone number is the user with successful identity authentication. On the condition that the intersection of the two is more than one number, it is determined that the user with the mobile phone number with the highest facial similarity in the intersection is the user with successful identity authentication.

Wherein, optionally, the base station management module 301 can perform a HASH encryption operation on the first mobile phone number list. Correspondingly, the face recognition background 303 also performs a HASH encryption operation on the second mobile phone number list, so that the results of the two after the HASH encryption operation is performed thereon are compared in the base station management module 301.

Fourth Embodiment (First Mode of Fuzzy Comparison Method)

Figure 17:
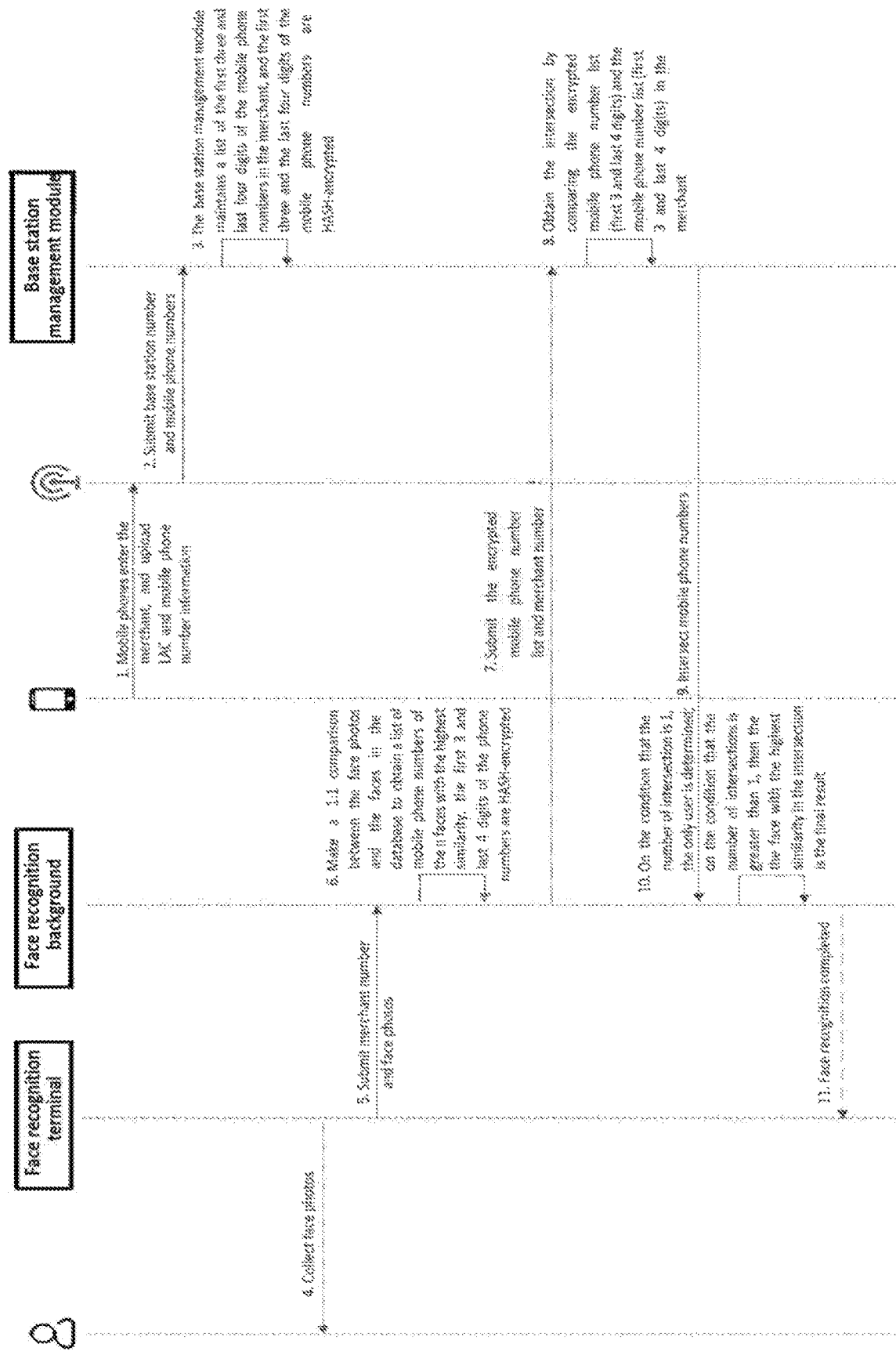
FIG. 17 is a schematic flowchart showing a biometric-based identity authentication method of the fourth embodiment.

FIG. 17 is a schematic flowchart showing a biometric-based identity authentication method of the fourth embodiment. In this embodiment, a HASH encryption method is adopted, and the first three and last four digits of a mobile phone number are used for obfuscation processing.

As shown in FIG. 17, the biometric-based identity authentication method of the fourth embodiment includes the following steps:

1. After the user enters the merchant, the mobile phone sends the location update information and mobile phone number information to the base station;
2. The base station sends the mobile phone numbers and base station number to the base station management module;
3. The base station management module dynamically maintains a list of mobile phone numbers in the merchant according to the base station number, and a HASH encryption is performed on the first three and last four digits of the mobile phone numbers;

4. The face recognition terminal collects faces;

5. The face recognition terminal uploads the merchant number and faces to the face recognition background;

6. The face recognition background performs a 1:1 comparison of the faces and the faces in the face database to obtain the n phone numbers of the faces with the highest similarity, and a HASH encryption is performed on the first three and last four digits of each phone number, where n is a natural number;

7. The face recognition background transmits the HASH-encrypted mobile phone numbers (first three and last four digits) to the base station management module;

8. The base station management module compares the list of mobile phone numbers maintained by it with the list of mobile phone numbers sent by the face recognition background to obtain the intersection of the two;

9. The intersection (HASH value) is returned to the face recognition background;

10. On the condition that the intersection is 1, the only user is confirmed. On the condition that the intersection is greater than 1, the face with the highest similarity in the intersection is the final result;

11. Face recognition is completed.

Figure 18:
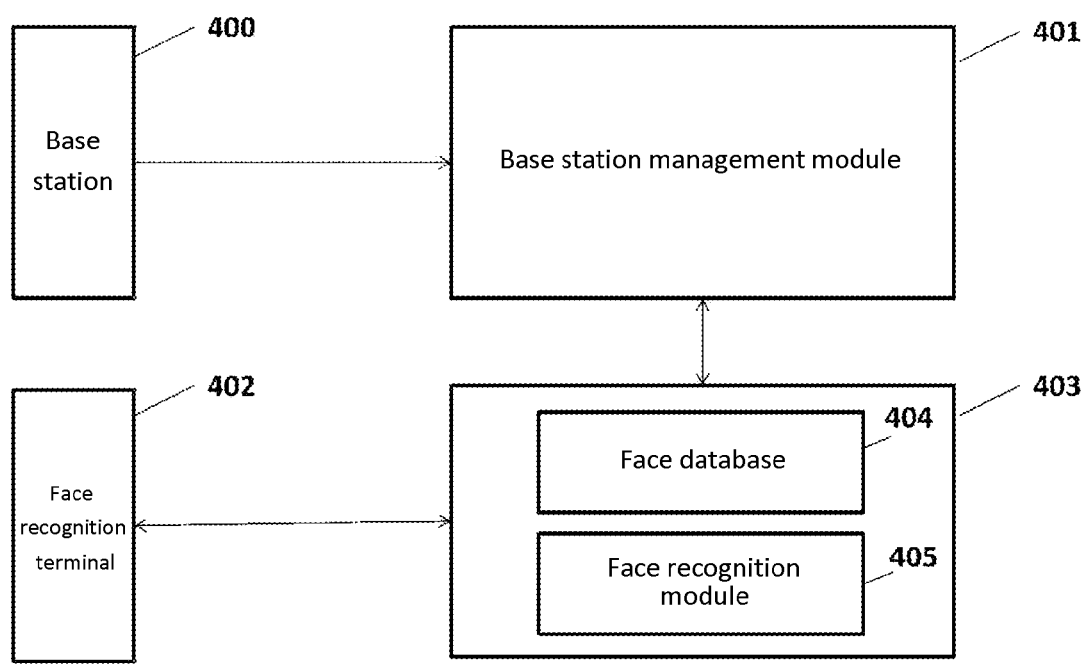
FIG. 18 is a block diagram showing the structure of a biometric-based identity authentication system of the fourth embodiment.

FIG. 18 is a block diagram showing the structure of a biometric-based identity authentication system of the fourth embodiment.

As shown in FIG. 18, the biometric-based identity authentication system of the fourth embodiment includes:

a base station 400 configured to obtain in real time the mobile phone numbers of users entering the coverage area of the base station, and sends the mobile phone numbers of the users and the identification number of the base station to a base station management module 401 below;

a base station management module 401 configured to receive the users' mobile phone numbers and the identification number of the base station from the base station 400, and obtain the mobile phone numbers of all users entering the merchant and take the first three and last four digits of the mobile phone numbers to generate a first mobile phone number list, according to the pre-stored association relationship between the identification number of the base station and the merchant number;

a face recognition terminal 402 configured to obtain the faces of the users;

a face recognition background 403 including a face database 404 used to pre-store the binding relationship between the users' faces and mobile phone numbers and a face recognition module 405, configured to obtain, according to the binding relationship, n mobile phone numbers with the highest similarity to the faces of the users recognized by the face recognition terminal and take the first three and last four digits of these mobile phone numbers to form a second mobile phone number list, and send the second mobile phone number list and the merchant number to the base station management module 401, where n is a natural number greater than 1.

Wherein, the base station management module 401 receives the second mobile phone number list sent by the face recognition background 403, compares the first mobile phone number list with the second mobile phone number list, and returns the intersection of the two to the face recognition background 403. The face recognition module 405 in the face recognition background 403 determines the intersection of the two received. On the condition that the intersection of the two is one mobile phone number, it is determined that the user of the mobile phone number is the user with successful identity authentication. On the condition that the intersection of is more than one number, it is determined that the user with the mobile phone number with the highest facial similarity in the intersection is the user with successful identity authentication.

Wherein, the base station management module 401 includes (not shown):

a first receiving module configured to receive the mobile phone numbers of users entering the coverage area of the base station and the identification number of the base station sent from the base station 400;

a base station database configured to pre-store the association relationship between the identification number of the base station and the merchant number of the merchant;

a first comparison processing module configured to obtain the mobile phone numbers of all users entering the merchant and take the first three and last four digits of the mobile phone numbers to generate a first mobile phone number list, according to the association relationship stored in the base station database and the users' mobile phone numbers and the identification number of the base station received by the first receiving module;

a second receiving module configured to receive from the outside (i.e., face recognition background 403) a second mobile phone number list, where the second mobile phone number list is composed of the first three and last four digits of the n mobile phone numbers with the highest similarity to biometrics of users, where n is a natural number greater than 1;

a second comparison processing module configured to compare the first mobile phone number list with the second mobile phone number list, and obtain the intersection of the two.

Wherein, optionally, the base station management module 401 can perform a HASH encryption operation on the first mobile phone number list. Correspondingly, the face recognition background 403 also performs a HASH encryption operation on the second mobile phone number list, so that the results of the two after the HASH encryption operation is performed thereon are compared in the base station management module 401.

Fifth Embodiment (Second Mode of Fuzzy Comparison Method)

Figure 19:
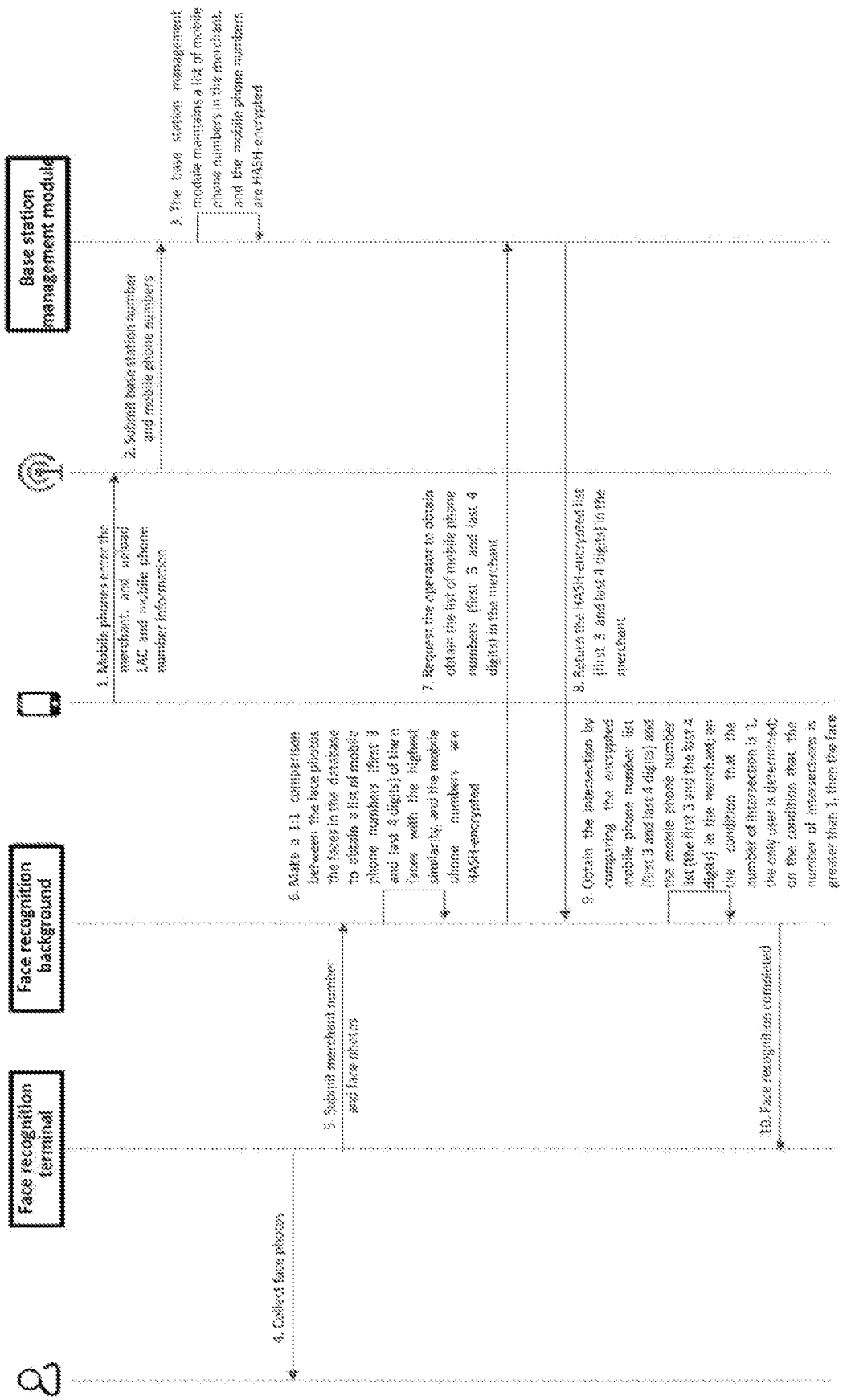
FIG. 19 is a schematic flowchart showing a biometric-based identity authentication method of the fifth embodiment.

FIG. 19 is a schematic flowchart showing a biometric-based identity authentication method of the fifth embodiment. In this embodiment, a HASH encryption method is adopted, and the first three and the last four digits of the mobile phone numbers are taken for fuzzy processing.

As shown in FIG. 19, the biometric-based identity authentication method of the fifth embodiment includes the following steps:

1. After the user enters the merchant, the mobile phones send the location update information and mobile phone number information to the base station;

2. The base station sends the mobile phone numbers and base station number to the base station management module;

3. The base station management module dynamically maintains a list of mobile phone numbers in the merchant based on the base station number, and performs a HASH encryption on the first three and last four digits of the mobile phone numbers;

4. The face recognition terminal collects faces;

5. The face recognition terminal uploads the merchant number and faces to the face recognition background;

6. The face recognition background performs a 1:1 comparison on the faces and the faces in the face database to obtain n phone numbers of the faces with the highest similarity. The first three and the last four digits of each mobile phone number are HASH-encrypted;

7. The face recognition background requests the base station management module to obtain a list of mobile phone numbers in the merchant;

8. The base station management module returns a list of the first three and last four digits of the mobile phone numbers encrypted by HASH in the merchant to the face recognition background;

9. The face recognition background obtains the intersection of the list of mobile phone numbers in the merchant and the list of n mobile phone numbers of the faces with the highest similarity. On the condition that the intersection is 1, the only user is confirmed. On the condition that the intersection is greater than 1, the face with the highest similarity in the intersection is the final result.

10. Face recognition is completed.

Figure 20:
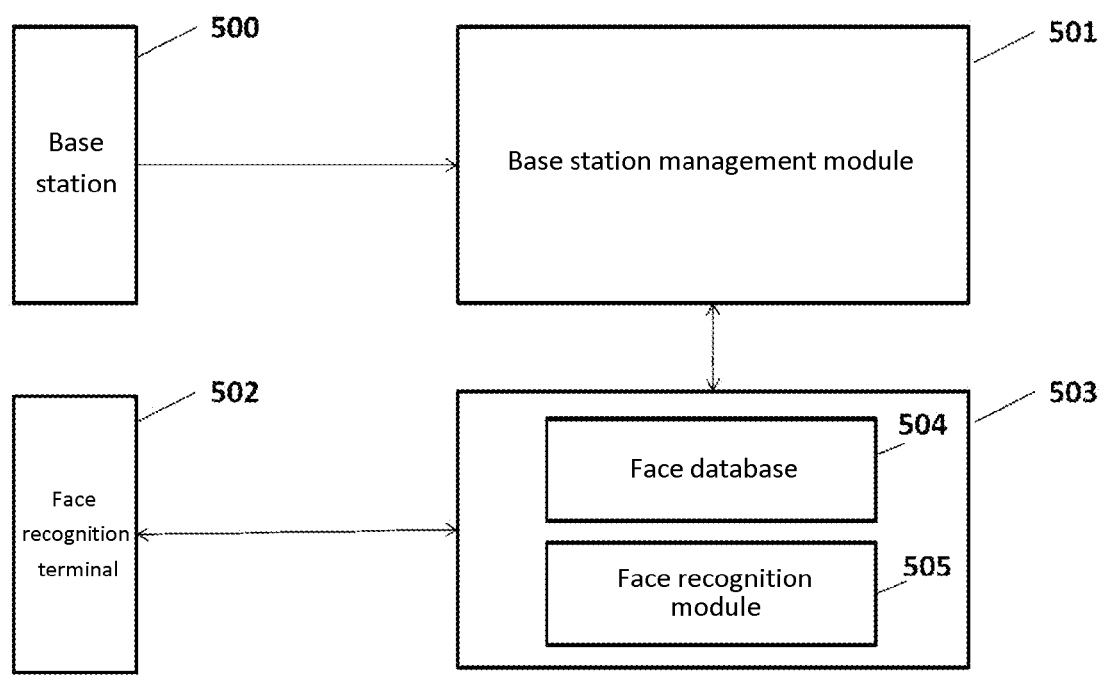
FIG. 20 is a block diagram showing the structure of a biometric-based identity authentication system of the fifth embodiment.

FIG. 20 is a block diagram showing the structure of a biometric-based identity authentication system of the fifth embodiment.

As shown in FIG. 20, the face-based identity authentication system of the fifth embodiment includes:

a base station 500 configured to obtain in real time the mobile phone numbers of users entering the coverage area of the base station, and send the mobile phone numbers of the users and the identification number of the base station to a base station management module 501 below;

a base station management module 501 configured to receive users' mobile phone numbers and the identification number of the base station from the base station 500, obtain the mobile phone numbers of all users entering the merchant and take the first three and the last four digits of the mobile phone numbers for fuzzy processing to generate a first mobile phone number list, according to the pre-stored association relationship between the identification number of the base station and the merchant's merchant number, and send the first mobile phone number list to the face recognition background 503 below;

a face recognition terminal 502 configured to obtain the faces of the users;

a face recognition background 503 including a face database 504 used to pre-store the binding relationship between the users' faces and mobile phone numbers and a face recognition module 505, configured to obtain n mobile phone numbers with the highest similarity to users' faces recognized by the face recognition terminal based on the binding relationship, and takes the first three and last four digits of the mobile phone numbers for fuzzy processing to form a second mobile phone number list, where n is a natural number greater than 1, and on the other hand, receive the first mobile phone number list sent by the base station management module 501, and compare the first mobile phone number list with the second mobile phone number list, wherein on the condition that the intersection of the two is one mobile phone number, it is determined that the user with the mobile phone number is the user with successful identity authentication, and on the condition that the intersection of the two is more than one number, it is determined that the user with the mobile phone number with the highest facial similarity in the intersection is the user with a successful identity authentication.

Wherein, optionally, the base station management module 501 can perform a HASH encryption operation on the first mobile phone number list. Correspondingly, the face recognition background 503 performs a HASH encryption operation on the second mobile phone number list, and compares the two after the HASH encryption operation is performed thereon.

Sixth Embodiment (Obfuscation and Fuzzy Comparison Method)

Figure 21:
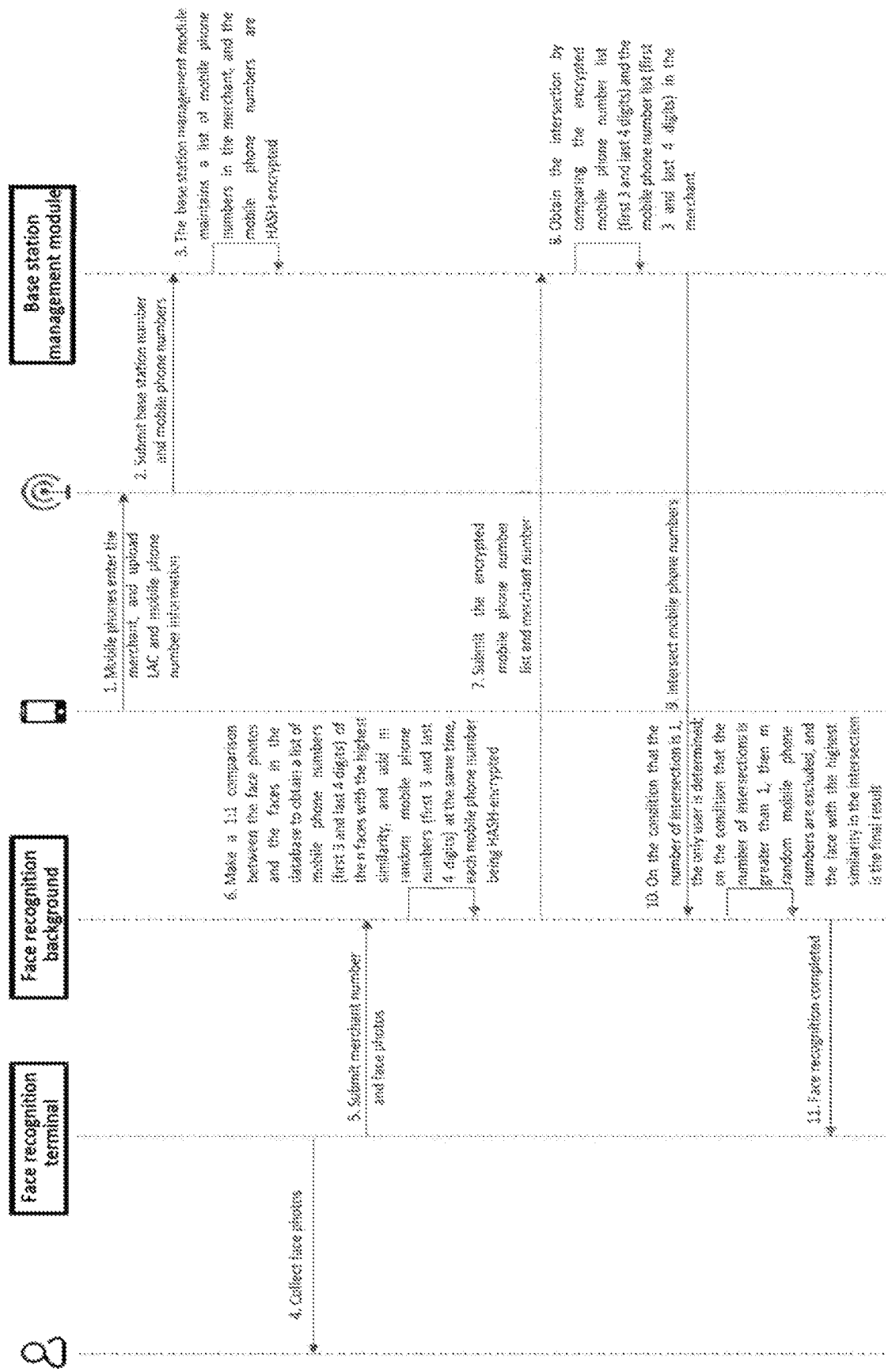
FIG. 21 is a schematic flowchart showing a biometric-based identity authentication method of the sixth embodiment.

FIG. 21 is a schematic flowchart showing a biometric-based identity authentication method of the sixth embodiment. In this embodiment, a HASH encryption method is adopted, and the first three and the last four digits of the mobile phone numbers are taken for fuzzy processing.

As shown in FIG. 21, the biometric-based identity authentication method of the sixth embodiment includes the following steps:

1. After the user enters the merchant, the mobile phones send the location update information and mobile phone number information to the base station;

2. The base station sends the mobile phone numbers and base station number to the base station management module;

3. The base station management module dynamically maintains a list of mobile phone numbers in the merchant based on the base station number, and the first three and last four digits of the mobile phone numbers are HASH-encrypted;

4. The face recognition terminal collects faces;

5. The face recognition terminal uploads the merchant number and faces to the face recognition background;

6. The face recognition background performs a 1:1 comparison between the faces and the faces in the face database to obtain n phone numbers of the faces with the highest similarity, while randomly generate m mobile phone numbers for obfuscation to form a list, wherein the first three and last four digits of each mobile phone number are HASH-encrypted, where m is a natural number;

7. The face recognition background transmits the m mobile phone numbers and n mobile phone numbers that have been HASH-encrypted to the base station management module;

8. The base station management module compares the list of mobile phone numbers maintained by it with the list of mobile phone numbers sent from the face recognition background to obtain the HASH value of the intersected mobile phone number;

9. The HASH value of the intersected mobile phone number is returned to the face recognition background;

10. On the condition that the intersection is 1, the only user is confirmed. On the condition that the intersection is greater than 1, m mobile phone numbers for obfuscation are excluded first, and then the face with the highest similarity in the intersection is the final result;

11. Face recognition is completed.

Figure 22:
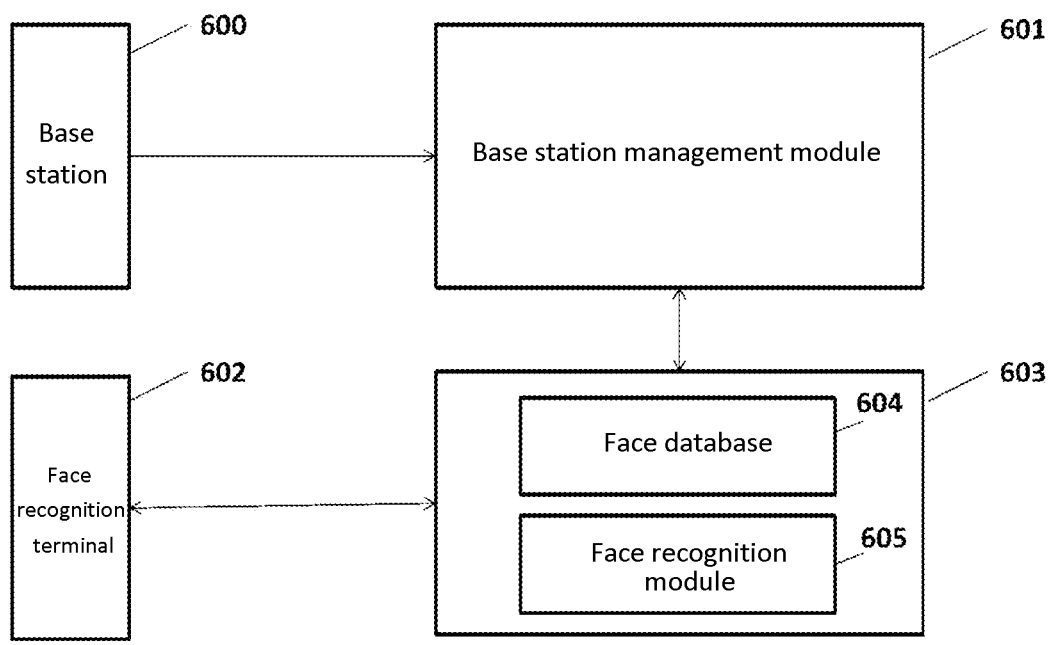
FIG. 22 is a block diagram showing the structure of a biometric-based identity authentication system of the sixth embodiment.

FIG. 22 is a block diagram showing the structure of a biometric-based identity authentication system according to the sixth embodiment.

As shown in FIG. 22, the face-based identity authentication system of the sixth embodiment includes:

a base station 600 configured to obtain in real time the mobile phone numbers of users entering the coverage area of the base station, and send the mobile phone numbers of the users and the identification number of the base station to a base station management module 601 below;

a base station management module 601 configured to receive users' mobile phone numbers and the identification number of the base station from the base station 600, and obtain the mobile phone numbers of all users entering the merchant and take the first three and last four digits of the mobile phone numbers to generate a first mobile phone number list, based on the pre-stored association relationship between the identification number of the base station and the merchant number;

a face recognition terminal 602 configured to obtain the faces of the users;

a face recognition background 603 including a face database 604 used to pre-store the binding relationship between users' faces and mobile phone numbers and a face recognition module 605, configured to obtain n mobile phone numbers with the highest similarity to users' faces recognized by the face recognition terminal and takes the first three and last four digits of the mobile phone numbers to form a second mobile phone number list, based on the binding relationship, where n is a natural number greater than 1, and m mobile phone numbers for obfuscation are added to form the second mobile phone number list, and send the second mobile phone number list and the merchant number to the base station management module 601, where m is a natural number.

Wherein, the base station management module 601 receives the merchant number sent by the face recognition background 603, compares the first mobile phone number list with the second mobile phone number list, and returns the intersection of the two to the face recognition background 603.

For the intersection of the two received, the face recognition module 605 in the face recognition background 603 first excludes the m mobile phone numbers for obfuscation and then makes a determination, wherein on the condition that the intersection of the two is one mobile phone number, it is determined that the user of the mobile phone number is the user with successful identity authentication, and on the condition that the intersection of the two is more than one number, it is determined that the user of the mobile phone number with the highest facial similarity in the intersection is the user with successful identity authentication.

Wherein, the base station management module 601 includes (not shown):

a first receiving module configured to receive the mobile phone numbers of users entering the coverage area of the base station and the identification number of the base station from the base station 600;

a base station database configured to pre-store the association relationship between the identification number of the base station and the merchant number of the merchant;

a first comparison processing module, configured to obtain the mobile phone numbers of all users entering the merchant and take the first three and last four digits of the mobile phone numbers to generate a first mobile phone number list, based on the association relationship stored in the base station database and the users' mobile phone numbers and the identification number of the base station received by the first receiving module;

a second receiving module configured to receive from the outside (i.e., face recognition background 603) a second mobile phone number list, wherein the second mobile phone number list is composed of the first three and four last digits of the n mobile phone numbers with the highest similarity to biometrics of users and the m mobile phone numbers for obfuscation, where n is a natural number greater than 1;

a second comparison processing module configured to compare the first mobile phone number list with the second mobile phone number list, and obtain the intersection of the two.

Wherein, optionally, the base station management module 601 can perform a HASH encryption operation on the first mobile phone number list. Correspondingly, the face recognition background 603 also performs a HASH encryption operation on the second mobile phone number list, so that the results of the two after the HASH encryption operation is performed thereon are compared in the base station management module 601.

As mentioned above, according to the biometric-based identity authentication method and the biometric-based identity authentication system of the present application, the base station can obtain users' mobile phone numbers (the base station can be a macro site or a small cell site), and the base station management module can be used to narrow down the range of face recognition N. As a result, users can use the 1:N face recognition in an open environment, thus greatly increasing the application scenarios of the 1:N face recognition. At the same time, users only need to carry a mobile phone and can complete the 1:N face recognition without additional operations.

The present application also provides a computer-readable medium with a computer program stored thereon, wherein when the computer program is executed by a processor, the above-mentioned biometric-based identity authentication method is realized.

The present application also provides a computer equipment, including a memory, a processor, and a computer program stored in the memory and running on the processor, wherein when the processor executes the computer program, the above-mentioned biometric-based identity authentication method is realized.

In view of the foregoing, the present application has been described by referring to the block diagrams of the structures of the components and the flowchart diagrams of the methods according to the embodiments of the present application. It is understood that the illustrations of the flowcharts and/or each block of the block diagrams, and combinations of the illustrations of the flowcharts and/or block diagrams, can be implemented by computer program instructions.

For example, these computer program instructions can be provided to the processor of a general-purpose computer, a special-purpose computer, or other programmable data processing equipment to form a machine, so that the instructions executed by the processor of the computer or other programmable data processing equipment are used to create the components used to implement the function/operation specified in these flowcharts and/or blocks and/or one or more flow block diagrams.

For example, these computer program instructions can also be loaded onto a computer or other programmable data processor so that a series of operation steps are executed on the computer or other programmable processor, so as to form a computer-implemented process, such that these instructions executed on the computer or other programmable data processors provide steps for implementing the functions or operations specified in one or more blocks of the flowcharts and/or block diagrams. It should also be noted that in some alternative implementations, the functions/operations shown in the blocks may occur not in accordance with the order shown in the flowcharts.

The above examples mainly illustrate the biometric-based identity authentication method and the biometric-based identity authentication system. Although only some of the specific embodiments of the present application have been described, those skilled in the art should understand that the present application may, without departing from its spirit and scope, be implemented in many other forms. Therefore, the examples and embodiments illustrated are regarded as illustrative but not restrictive. The present application may, without departing from the spirit and scope of the present application as defined by the appended claims, cover various modifications and replacements.

What is claimed is:

1. A biometric-based identity authentication method, the biometric-based identity authentication method being a method for identity authentication based on biometrics of users and mobile terminals carried by the users, comprising:
   a step of generating a first mobile terminal number list: obtaining mobile terminal numbers of all users entering a specified area through a base station associated with the specified area which the users enter to generate the first mobile terminal number list;
   a step of generating a second mobile terminal number list: recognizing biometrics of the users, and obtaining the second mobile terminal number list composed of n mobile terminal numbers with the highest similarity to the biometrics based on a pre-established binding relationship between biometrics of users and mobile terminal numbers, where n is a natural number greater than 1; and
   a step of comparison: comparing the first mobile terminal number list with the second mobile terminal number list, wherein on the condition that the intersection of the first mobile terminal number list and the second mobile terminal number list is one mobile terminal number, it is determined that the user of the mobile terminal number is the user with successful identity authentication, and on the condition that the intersection of the two is more than one number, it is determined that the user of the mobile terminal number with the highest similarity to the biometrics in the intersection is the user with successful identity authentication,
   wherein a corresponding association relationship between the specified area and the base station is pre-established,
   wherein the corresponding association relationship between the specified area and the base station includes any one of the following:
   one specified area corresponds to one base station;
   one base station corresponds to multiple specified areas; and
   multiple specified areas correspond to one base station,
   wherein, in the step of generating the first mobile terminal number list, for each of the mobile terminal numbers of all users entering the specified area, part of the numbers at specified positions are collected out of the mobile terminal numbers to generate the first mobile terminal number list, and
   in the step of generating the second mobile terminal number list, for each of the n mobile terminal numbers with the highest similarity, part of the numbers at the same specified positions are collected out of the mobile terminal numbers to generate the second mobile terminal number list.

2. The biometric-based identity authentication method according to claim 1, wherein:
   in the step of generating the first mobile terminal number list, further perform a prescribed encryption operation on the mobile terminal numbers of all users entering the specified area to generate the first mobile terminal number list, and
   in the step of generating the second mobile terminal number list, further perform the prescribed encryption operation on the n mobile terminal numbers with the highest similarity to generate the second mobile terminal number list.

3. The biometric-based identity authentication method according to claim 1, wherein:
   in the step of generating the second mobile terminal number list, recognize the biometrics of the user, and obtain the n mobile terminal numbers with the highest similarity to the biometrics based on the pre-established binding relationship between the biometrics of the users and the mobile terminal numbers, while randomly generate m mobile terminal numbers for obfuscation, wherein the n mobile terminal numbers and the m mobile terminal numbers for obfuscation form the second mobile terminal number list, where m is a natural number.

4. The biometric-based identity authentication method according to claim 3, wherein:
   in the step of generating the first mobile terminal number list, further perform a prescribed encryption operation on the mobile terminal numbers of all users entering the specified area to generate the first mobile terminal number list, and
   in the step of generating the second mobile terminal number list, further perform the prescribed encryption operation on the n mobile terminal numbers and the m mobile numbers for obfuscation to generate the second mobile terminal number list.

5. The biometric-based identity authentication method according to claim 1, wherein:
   in the step of generating the first mobile terminal number list, further perform a prescribed encryption operation on the part of the numbers at specified positions collected out of the mobile terminal numbers to generate the first mobile terminal number list,
   in the step of generating the second mobile terminal number list, further perform a prescribed encryption operation on the part of the numbers at the specified positions collected out of the mobile terminal numbers to generate the second mobile terminal number list.

6. The biometric-based identity authentication method according to claim 1, wherein:
   in the step of generating the second mobile terminal number list, obtain n mobile terminal numbers with the highest similarity to the biometrics, while randomly generate m mobile terminal numbers for obfuscation, wherein for each of the n mobile terminal numbers and the m mobile numbers for obfuscation, the part of the numbers at the specified positions are collected out of the mobile terminal numbers to generate the second mobile terminal number list.

7. The biometric-based identity authentication method according to claim 6, wherein:
   in the step of generating the first mobile terminal number list, further perform a prescribed encryption operation on the part of the numbers at specified positions collected out of the mobile terminal numbers to generate the first mobile terminal number list, and
   in the step of generating the second mobile terminal number list, further perform a prescribed encryption operation on the part of the numbers at the same specified positions collected out of the mobile terminal numbers to generate the second mobile terminal number list.

8. The biometric-based identity authentication method according to claim 1, wherein:
   the biometrics include any one or combination of the following: human faces, finger veins, irises, fingerprints, palm prints, and voices.

9. The biometric-based identity authentication method according to claim 1, wherein:

the specified areas are merchants, transportation facilities, buildings, and commercial areas.

10. A non-transitory computer-readable medium with a computer program stored thereon, wherein:

when the computer program is executed by a processor, the biometric-based identity authentication method according to claim 1 is implemented.

11. A computer equipment, including a memory, a processor, and a computer program stored on the memory and executable on the processor, wherein when the computer program is executed by the processor, the biometric-based identity authentication method according to claim 1 is implemented.

* * * * *